(12) United States Patent
Varkey et al.

(10) Patent No.: US 9,080,087 B2
(45) Date of Patent: Jul. 14, 2015

(54) REDUCTION IN MODULUS OF POLYURETHANE SEALANTS AND ADHESIVES

(75) Inventors: Jyothi Thazhakuzhy Varkey, Shakopee, MN (US); Patrick Knoll, Minneapolis, MN (US); Robert Louis Ferenz, Chaska, MN (US); Eric S. Wymer, New Prague, MN (US)

(73) Assignee: Construction Research & Technology GmbH, Trostberg (DE)

( * ) Notice: Subject to any disclaimer, the term of this patent is extended or adjusted under 35 U.S.C. 154(b) by 138 days.

(21) Appl. No.: 13/811,110

(22) PCT Filed: Jul. 18, 2011

(86) PCT No.: PCT/EP2011/062259
§ 371 (c)(1),
(2), (4) Date: May 21, 2013

(87) PCT Pub. No.: WO2012/010558
PCT Pub. Date: Jan. 26, 2012

(65) Prior Publication Data
US 2013/0267637 A1    Oct. 10, 2013

Related U.S. Application Data

(60) Provisional application No. 61/366,695, filed on Jul. 22, 2010, provisional application No. 61/492,572, filed on Jun. 2, 2011.

(51) Int. Cl.
| | | |
|---|---|---|
| C09J 175/04 | (2006.01) |
| C08G 18/12 | (2006.01) |
| C08G 18/40 | (2006.01) |
| C08G 18/42 | (2006.01) |
| C08G 18/48 | (2006.01) |
| C08G 18/75 | (2006.01) |
| C08K 5/00 | (2006.01) |
| C08K 5/12 | (2006.01) |
| C08L 93/04 | (2006.01) |

(52) U.S. Cl.
CPC ............... *C09J 175/04* (2013.01); *C08G 18/12* (2013.01); *C08G 18/4018* (2013.01); *C08G 18/4288* (2013.01); *C08G 18/4891* (2013.01); *C08G 18/755* (2013.01); *C08G 2190/00* (2013.01); *C08K 5/0016* (2013.01); *C08K 5/12* (2013.01); *C08L 93/04* (2013.01)

(58) Field of Classification Search
CPC .................................................... C09J 175/04
USPC ........................................................ 524/270
See application file for complete search history.

(56) References Cited

U.S. PATENT DOCUMENTS

| | | | |
|---|---|---|---|
| 5,229,454 A | | 7/1993 | Weichmann |
| 5,266,145 A | * | 11/1993 | Duck et al. ................. 156/307.3 |
| 7,612,151 B2 | * | 11/2009 | Minamida et al. ............ 525/453 |
| 2004/0229048 A1 | * | 11/2004 | Kesselmayer ............. 428/423.1 |
| 2006/0004175 A1 | | 1/2006 | Kollbach et al. |
| 2006/0264524 A1 | | 11/2006 | Abraham et al. |
| 2007/0232764 A1 | | 10/2007 | Minamida et al. |
| 2008/0292902 A1 | | 11/2008 | Reid |
| 2009/0062432 A1 | | 3/2009 | Doesburg et al. |
| 2010/0197878 A1 | * | 8/2010 | Casati et al. .................. 526/319 |
| 2013/0303690 A1 | | 11/2013 | Varkey et al. |

FOREIGN PATENT DOCUMENTS

| | | |
|---|---|---|
| EP | 1 734 095 A1 | 12/2006 |
| WO | WO 2009/020774 A1 | 2/2009 |
| WO | WO 2012/010558 A1 | 1/2012 |

OTHER PUBLICATIONS

Author unknown, "Vertellus Polycin GR Polyols", G. R. O'Shea Company Product Bulletin, Apr. 17, 2007.

* cited by examiner

*Primary Examiner* — Kelechi Egwim
(74) *Attorney, Agent, or Firm* — Curatolo Sidoti Co., LPA; Joseph G. Curatolo; Salvatora A. Sidoti

(57) ABSTRACT

Low modulus, polyurethane sealant or adhesive compositions and a method of reducing the modulus of a polyurethane sealant or adhesive composition, including adding a modulus reducing additive of at least one of rosin esters, hydrogenated rosin esters, or mixtures thereof, to a sealant or adhesive composition including a polyurethane prepolymer, optionally having a bio-based content of from about 15% to about 75% by weight.

22 Claims, 11 Drawing Sheets

US 9,080,087 B2

REDUCTION IN MODULUS OF POLYURETHANE SEALANTS AND ADHESIVES

CROSS REFERENCE TO RELATED APPLICATIONS

This application is a national stage application of International Application No. PCT/EP2011/062259, filed 18 Jul. 2011, which claims priority from U.S. Provisional Patent Application No. 61/366,695, filed 22 Jul. 2010, and from U.S. Provisional Patent Application No. 61/492,572, filed 2 Jun. 2011, from which applications priority is claimed, and which are incorporated herein by reference.

Sealants are commonly used in building and civil engineering works to accommodate continuing changes in size of the joint due to thermal, moisture and structural movements. When selecting the proper sealant for joints in clay or concrete masonry walls, movement capability is critical to avoid cohesive and adhesive sealant failures. Sealant extensibility can be a key factor in determining joint width and spacing, and in preventing cracks.

The movement capability of sealants is closely related to the modulus of elasticity. Modulus can sometimes predict the extension or compression characteristics of a sealant. The modulus is the ratio of the force (stress) needed to elongate (strain) a sealant to a certain point, typically 100%. Elongation defines the length to which the sealant can stretch, expressed as a percentage of its original size. The modulus has a direct effect on the elongation capacity, since the lower the tensile strength, the easier the sealant may stretch.

Low to medium modulus sealants tend to have high movement capability and are able to accommodate significant movement without putting much stress on the sealant or the substrate. Low modulus sealants are softer and will stretch more easily. High modulus sealants usually have lower movement capacity and are recommended for uses where high strength is required and little movement is expected. High modulus sealants are so strong, they put relatively high stress on the adhesive bond or substrate. In the case of weak-tensioned substrates such as concrete and EIFS, this stress can suffice to spall or otherwise damage the joint face. Low modulus sealants, in contrast, put less stress on the bond line for the same amount of elongation, and are therefore less likely to spall a weak substrate.

It would be advantageous to provide sealants and adhesives that have high bio-based content, low volatile organic content, and are low modulus with high movement capability.

Figure 1:
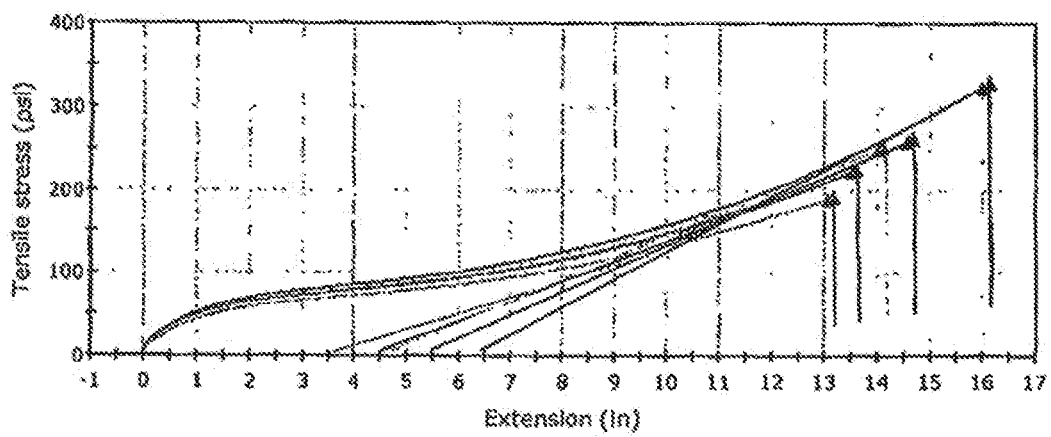
FIG. 1 is a graphical representation of the results of an ASTM D412 Tensile Test for the Sealant of Example 2.

A low modulus sealant or adhesive composition is provided comprising (i) a polyurethane prepolymer comprising an isocyanate and a polyol, optionally having a bio-based content of from about 15% to about 75% by weight; and (ii) a modulus reducing additive comprising at least one of rosin esters, hydrogenated rosin esters, or mixtures thereof.

The polyol having a bio-based content may comprise (a) a polyol entirely derived from a natural oil; and/or (b) a natural oil-petroleum blend polyol. In certain embodiments, the polyol further comprises at least one of catalyst, drying agent, or plasticizer.

The modulus reducing additive may comprise at least one of glycerol ester of hydrogenated rosin, pentaerythritol ester of hydrogenated rosin, or mixtures thereof.

In certain embodiments, the modulus reducing additive may be present in the composition in an amount sufficient to provide a 100% modulus of less than or equal to 85 psi for a sealant and less than or equal to 100 psi for an adhesive composition. In certain embodiments, the modulus reducing additive may be present in the composition in an amount sufficient to provide a 100% modulus of about 40 psi for a sealant composition and about 86 psi for an adhesive composition.

In certain sealant embodiments, the modulus reducing additive is present in an amount from about 0.5 wt. % to about 2 wt. %. In certain adhesive embodiments, the modulus reducing additive is present in an amount from about 1 wt. % to about 5 wt. %.

In certain embodiments, the low modulus sealant composition when cured has a 100% modulus of less than or equal to 85 psi, optionally from about 40 to about 85 psi. In certain embodiments, the low modulus adhesive composition when cured has a 100% modulus of less than or equal to 100 psi, optionally from about 86 to about 100 psi.

Without wishing to be bound by any particular theory, it is presently believed that the modulus reducing additive is effective in lowering the 100% modulus of sealants and adhesive compositions as it exercises a plasticizing effect, loosening the bonds of an otherwise highly crosslinked system to make the compositions more flexible.

For purposes of illustration but not by way of limitation, the modulus reducing additives comprise esters of rosins or hydrogenated rosins are bio-based materials derived from pine trees. Examples of rosin esters which may be suitably applied in the subject composition and method comprise the glycerol ester of hydrogenated rosin or pentaerythritol ester of hydrogenated rosin, or suitable mixtures thereof.

In certain embodiments, the modulus reducing additive is Foralyn™ 90 Ester of Hydrogenated Rosin from Eastman Chemical BV (The Netherlands), the glycerol ester of hydrogenated rosin having a Ring and Ball Softening Point of 82° C. as measured by ASTM E 28. In certain high melting temperature embodiments, the modulus reducing additive may comprise Foralyn™ 110 Ester of Hydrogenated Rosin from Eastman Chemical BV, a pentaerythritol ester of hydrogenated rosin having a Ring and Ball Softening Point of 109° C. as measured by ASTM E 28.

A polyurethane prepolymer based substantially on renewable raw materials may comprise the reaction product of a reactant formulation comprising (a) a polyol entirely derived from a natural oil; (b) a natural oil-petroleum blend polyol; and (c) an isocyanate, wherein the prepolymer has a bio-based content of from about 15% to about 75% by weight.

For purposes of illustration but not by way of limitation, the polyol entirely derived from natural oil may be essentially a vegetable oil derivative. In certain embodiments, suitable polyols entirely derived from natural oil are 100% castor oil based Polyols, such as those available commercially from Vertellus Performance Material Inc. (Greensboro, N.C.). In certain embodiments, the 100% castor oil based polyol has at least one of an average molecular weight (Mn) of about 3400 to about 4000 grams/mole, a functionality of 2 and a hydroxyl number from 33 to 40.

In certain embodiments, the 100% castor oil based polyol is Polycin® GR-35 Polyol from Vertellus Performance Material Inc., a 100% solids, castor oil based polyol having a molecular weight of 3450, a viscosity (cP) of 2000, and a functionality of 2.

The amount of polyol entirely derived from a natural oil that is used typically may be about 45% to about 65% in certain embodiments about 58% to about 62% by weight, based on the total weight of the prepolymer.

For purposes of illustration but not by way of limitation, the natural oil-petroleum blend polyol comprises a castor oil-petroleum blend polyol having a functionality of from about 2 to about 2.75. In certain embodiments, the natural oil-petroleum blend polyol may comprise Lupranol® BALANCE 50 from Elastogran GmbH of the BASF Group, a polyether polyol having a functionality of from about 2 to about 2.75 based on a renewable raw material which contains mainly secondary hydroxy groups, being about 31% castor oil based and the remainder petroleum based. In other embodiments, the natural oil/petroleum ratio may be 20/80. The amount of natural oil-petroleum blend polyol that is typically used in the prepolymer may be about 15% to about 45%, in certain embodiments about 19% to about 22% by weight, based on the total weight of the prepolymer.

For purposes of illustration but not by way of limitation, the isocyanate may be aromatic, aliphatic or cycloaliphatic and may have an average functionality equal to about 2.

For purposes of illustration but not by way of limitation, the isocyanate may comprise at least one of toluene diisocyanate (TDI), methylene diphenyl diisocyanate (MDI), phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanate, isophorone diisocyanate (IPDI), dimers and trimers of these diisocyanates or mixtures thereof.

For purposes of illustration but not by way of limitation, in certain embodiments, the isocyanate may comprise at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, urethodione diisocyanate, isocyanurate triisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; 3,3'-dimethyldiphenylmethane-4,4'-diisocyanate, 1-isocyanatomethyl-3-isocyanato-1,5,5-trimethyl diisocyanate, dimers or trimers of these isocyanates, or mixtures thereof.

For purposes of illustration but not by way of limitation, in some embodiments the isocyanate may comprise at least one of 1-isocyanatomethyl-3-isocyanato-1,5,5-trimethyl diisocyanate (isophorone diisocyanate, IPDI), toluene diisocyanate (TDI), methylene diphenyl diisocyanate (MDI), or mixtures thereof.

For purposes of illustration but not by way of limitation, in certain embodiments, the isocyanate may be a monomeric cycloaliphatic diisocyanate commercially available as Desmodur I (IPDI) marketed by Bayer Material Science. The amount of isocyanate that is typically used in the prepolymer may be about 10% to about 22%, in certain embodiments about 10% to about 14% by weight, based on the total weight of the prepolymer.

For purposes of illustration but not by way of limitation, the reactant formulation additionally may comprise at least one of catalyst, plasticizer, or drying agent. In certain embodiments, the reactant formulation may additionally comprise at least one of organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agent, storage stabilizer, latent hardener, cure retarder, or mixtures thereof.

In certain embodiments, one or more tertiary amine catalysts capable of accelerating the isocyanate-polyol reaction may be used. For purposes of illustration but not by way of limitation, suitable tertiary amine catalysts include Dabco 33LV or Dabco BL-19, available from Air Products & Chemicals, Inc., metal catalysts such as Dibutyl Tin Dilaurate (DBTDL) or mixtures thereof. The amount of catalyst typically used may be about 0.05% to about 1%, in certain embodiments about 0.1% to about 0.4% by weight, based on the total weight of the prepolymer.

For purposes of illustration but not by way of limitation, the drying agent may comprise para toluene sulfonyl isocyanate (PTSI). The amount of drying agent typically used usually may be about 0.5% to about 3%, in certain embodiments, about 1% to about 2% by weight, based on the total weight of the prepolymer.

For purposes of illustration but not by way of limitation, the plasticizer may comprise at least one of adipate, azelainate, sebacate, sulfonate, trimellitate, phosphate, fumarate, or maleate ester or diester, or mixtures thereof.

For illustration purposes but not by way of limitation, the plasticizer may comprise at least one of dioctyl adipate, 2-ethylhexyl adipate, diisononyl adipate, or diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl)fumarate, diisobutyl fumarate, or bis(2-ethylhexyl)fumarate, dimethyl maleate or diethyl maleate, or mixtures thereof.

For purposes of illustration but not by way of limitation, in certain embodiments the plasticizer may be a phthalate-free plasticizer. In certain embodiments, suitable phthalate-free plasticizers include Hexamoll® DINCH available from BASF. The amount of plasticizer typically used may be about 5% to about 8%, in certain embodiments about 6% to about 7% by weight, based on the total weight of the prepolymer.

In certain embodiments, the polyurethane prepolymer comprises the reaction product of a reactant formulation comprising:
  a. from about 45% to about 65%, in certain embodiments about 58% to about 62% by weight, based on the total weight of the prepolymer, of a 100% castor oil based polyol having a functionality of 2,
  b. from about 15% to about 45%, in certain embodiments about 19% to about 22% by weight, based on the total weight of the prepolymer, of a castor oil-petroleum blend polyol having a functionality of about 2 to about 2.75;
  c. from about 10% to about 22%, in certain embodiments about 10% to about 14% by weight, based on the total weight of the prepolymer, of isophorone diisocyanate (IPDI);
  d. from about 0.05% to about 1% by weight, in certain embodiments about 0.1% to about 0.4% by weight, based on the total weight of the prepolymer, of at least one tertiary amine catalyst;
  e. from about 5% to about 8% by weight, in certain embodiments about 6% to about 7% by weight, based on the total weight of the prepolymer, of a phthalate-free plasticizer; and
  f. from about 0.5% to about 3% by weight, in certain embodiments about 1% to about 2% by weight, based on the total weight of the prepolymer, of a drying agent; wherein the prepolymer has a bio-based content of about 15% to about 75% by weight.

In certain embodiments, the prepolymer may have an NCO content of from about 1% to about 3% by weight, and in certain embodiments about 2% to about 2.98% by weight, as measured by 0.1N HCl Titration using an automatic titrator, as per ASTM D-2572-80 (Test method for Isocyanate Groups in Urethane Prepolymers).

In certain embodiments, the viscosity of the polyurethane prepolymer may be in the range of 50 poise to 500 poise at 24° C. (72° F.), and in certain embodiments from 118 poise to 300 poise at 24° C. (72° F.), as measured by Brookfield viscometer.

In certain embodiments, the bio-based content of the prepolymer may be from about 15% to about 75%, and in some embodiments from 15% to 40% by weight.

In certain embodiments, the polyurethane prepolymer has zero to very low volatile organic content (VOC) and a high bio-based content in the range of from about 15% to about 75% by weight.

In certain embodiments, the polyurethane prepolymer may have a peak molecular weight (Mp) in the range of 10,000 to 100,000, as measured by GPC (Gel Permeation Chromatography).

The polyurethane prepolymer may be prepared by reacting a polyol entirely derived from a natural oil, a natural oil-petroleum blend polyol, an isocyanate, and in certain embodiments, at least one of catalyst (optionally a tertiary amine catalyst), drying agent, or plasticizer, for a sufficient time to produce a polyurethane prepolymer, wherein the prepolymer has a bio-based content of from about 15% to about 75% by weight.

In certain embodiments, the polyurethane prepolymers are suitable as a sealant or an adhesive component for substrates including, but not limited to, at least one of concrete, stone, metal, ceramic, glass, plastic, wood, asphalt, vinyl, carpet, thermoplastic materials, thermoset materials, rubber or composite materials.

In certain embodiments, a low modulus, paintable, one component, moisture curable polyurethane sealant having renewable material content is provided comprising (a) a polyurethane prepolymer comprising the reaction product of a reactant formulation comprising an isocyanate and a polyol having a bio-based content of from about 15% to about 75% by weight, (b) a modulus reducing additive comprising at least one of rosin esters, hydrogenated rosin esters, or mixtures thereof, (c) at least one of catalyst, drying agent, or plasticizer, and (d) optionally at least one additive comprising organic filler, inorganic filler, chain extender, antioxidant, UV stabilizer, light stabilizer, fungicide, mildewcide, biocide, fire retardant, surface additive, coloring agents, solvent, mineral oil, thixotropic agent, dispersing agent, adhesion promoter, defoaming agent, storage stabilizer, latent hardener, cure retarder, or mixtures thereof. The sealant optionally contains recycled filler, and has zero to very low VOC, that is optionally phthalate-free, tin-free, PVC-free, halogen-free, and solvent-free.

The polyurethane prepolymer may comprise (a) a polyol entirely derived from a natural oil; and/or (b) a natural oil-petroleum blend polyol.

The sealant is compliant with ASTM C920, ISO 11600, DIN and JIS standards at a minimum with targeted joint movement of +/−35%.

Also provided is a method for making a low modulus, moisture-curable polyurethane sealant capable of curing to form a reaction product, comprising providing a polyurethane prepolymer which is a product of the reaction of an isocyanate and a polyol having a bio-based content of from about 15% to about 75% by weight, and admixing with the polyurethane prepolymer (i) a modulus reducing additive comprising at least one of rosin esters, hydrogenated rosin esters, or mixtures thereof, (ii) at least one of catalyst, drying agent, or plasticizer, and (iii) optionally at least one additive comprising organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agent, storage stabilizer, latent hardener, cure retarder, or mixtures thereof, for a sufficient time to produce a polyurethane sealant.

The polyurethane prepolymer may comprises (a) a polyol entirely derived from a natural oil; and/or (b) a natural oil-petroleum blend polyol, and an isocyanate, and in certain embodiments may further comprise at least one of catalyst, drying agent, or plasticizer.

The sealant may exhibit at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C. (72° F.), and a sag of from about 0 to about 0.18 inch.

In certain embodiments, the adhesive utilizes bio-based raw materials, recycled materials, non-tin based catalysts, and is phthalate free.

In certain embodiments, a low modulus, one component, moisture-curable, trowel grade polyurethane adhesive is provided comprising:
  a) a polyurethane prepolymer comprising the reaction product of a reactant formulation comprising a polyol entirely derived from a natural oil, a natural oil-petroleum blend polyol, an isocyanate and at least one of catalyst, plasticizer, or drying agent,
  b) a modulus reducing additive comprising at least one of rosin esters, hydrogenated rosin esters, or mixtures thereof; and
  c) at least one of catalyst, drying agent, or plasticizer, and
  d) optionally at least one additive comprising organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agent, storage stabilizer, latent hardener, cure retarder, or mixtures thereof.

In certain embodiments, the prepolymer is prepared by providing polyols, and then adding isocyanate, plasticizer and catalyst. Once the experimental NCO % is close to theoretical NCO %, the batch is allowed to cool and drying agent may be added.

In certain embodiments, the adhesive may exhibit at least one of a bio-based content of from about 10% to about 20% by weight, an adhesive strength of from about 100 to about 175 psi as measured by lap shear testing, and a viscosity of from about 1200 poise to about 2000 poise at 24° C. (72° F.).

A method is provided for making a low modulus, moisture-curable polyurethane adhesive capable of curing to form a reaction product, comprising a) providing a polyurethane prepolymer which is a product of the reaction of a reactant formulation comprising a polyol entirely derived from a natural oil and/or a natural oil-petroleum blend polyol, and an isocyanate; and
  b) admixing with the polyurethane prepolymer (i) a modulus reducing additive comprising at least one of rosin esters, hydrogenated rosin esters, or mixtures thereof, and (ii) at least one of catalyst, drying agent, or plasticizer, and (iii) optionally at least one additive comprising organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agent, storage stabilizer, latent hardener, cure retarder, or mixtures thereof, for a sufficient time to produce the low modulus polyurethane adhesive.

Also provided is a method is of reducing the modulus of a polyurethane sealant or adhesive composition, comprising incorporating a modulus reducing additive comprising at least one of rosin esters, hydrogenated rosin esters, or mixtures thereof, into a composition comprising a polyurethane prepolymer comprising an isocyanate and a polyol, the polyol optionally having a bio-based content of from about 15% to about 75% by weight; wherein said modulus reducing additive reduces the extension modulus at 100% elongation of the sealant composition to less than about 72 psi as measured in accordance with ASTM D-412.

In certain embodiments, the adhesive may exhibit at least one of a bio-based content of from about 10% to about 20% by weight, an adhesive strength of from about 100 to about 175 psi as measured by lap shear testing, and a viscosity of from about 1200 poise to about 2000 poise at 24° C. (72° F.).

For purposes of illustration but not by way of limitation, the polyurethane adhesive and polyurethane sealant formulations may comprise in addition to the polyols, isocyanate, catalyst, plasticizer and drying agent of the prepolymer, components which may include, but are not limited to, at least one of organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agent, storage stabilizer, latent hardener, cure retarder, or mixtures thereof.

In certain embodiments, the total amount of such additives may be from about 10 to about 50 weight percent; and in certain embodiments about 25 to about 40 weight percent, based on the total weight of the polyurethane formulation.

By way of example, but not of limitation, the polyurethane adhesive and polyurethane sealant formulations may contain from 0 to about 5 percent by weight of UV absorber, from 0 to about 5 percent by weight of antioxidant, from 0 to about 2 percent by weight of mildewcide, from 0 to about 2 percent by weight of biocide, from 0 to about 2 percent by weight of fungicide, from 0 to about 20 percent by weight of fire or flame retardant, from 0 to about 10 percent by weight of pigment, from 0 to about 5 percent by weight of catalyst, from 0 to about 5 percent by weight of adhesion promoter, from 0 to about 10 percent by weight of flow and leveling additive, from 0 to about 5 percent by weight of wetting agent, from 0 to about 2 percent by weight of antifoaming agent, from 0 to about 5 percent by weight of storage stabilizer, from 0 to about 10 percent by weight of latent hardener, from 0 to about 30 percent by weight of plasticizer, from 0 to about 30 percent by weight of dispersing agent, from 0 to about 10 percent by weight solvent, and in certain embodiments from 3 percent to about 10 percent by weight solvent, from about 20 to about 50 percent by weight of filler, from about 0 to about 5 percent by weight of drying agent, and/or from 0 to about 20 percent by weight of rheology modifier.

Representative examples of plasticizers are enumerated above.

In certain embodiments, a rheology modifier may be added to increase the viscosity of the adhesive or sealant immediately after application to a substrate. This can prevent the adhesive or sealant from dripping or running when initially applied to a substrate. For illustration purposes but not by way of limitation, the rheology modifier comprises at least one of polyureas, fumed silica, hydroxyethyl cellulose, hydroxypropyl cellulose, polyamide waxes, modified castor oil, clay intercalated with organic cations, calcium carbonate, talc, acrylate polymers, PVC plastisols, polyurea-plasticizer dispersions, or mixtures thereof. Talc may be used as a filler and/or a rheology modifier.

To reduce costs and add recycled content, in certain embodiments various fillers may be used in the adhesive and sealant formulations. For example, a filler may be a solid that is inert to other materials in the formulation. For purposes of illustration but not by way of limitation, the filler may comprise at least one of recycled fillers, organic fibers, inorganic fibers, rubber particles, cork particles, carbon black, titanium dioxide, glass, crushed glass, glass spheres, iron particles, quartz, silica, amorphous precipitated silica, hydrophilic fumed silica, hydrophobic fumed silica, kaolin, mica, diatomaceous earth, talc, zeolites, clays, aluminum hydroxide, sulfates, aluminum sulfate, barium sulfate, calcium carbonate, dolomite, calcium sulfate, barites, limestone, wollastonite, perlite, flint powder, kryolite, alumina, alumina trihydrate, polymer granules, polymer powders, granulated or micronized polyethylene granulated or micronized polypropylene, melamine, polypropylene fibers, nylon fibers, zinc oxide, or mixtures thereof. Carbon black and titanium dioxide may be used as both a filler and a pigment.

In certain embodiments, fillers may be used in the adhesive and sealant formulations to produce desirable flow characteristics. However, the presence of high proportions of fillers in sealant formulations, particularly fillers of higher particle size, tends to lead to cured compositions with a modulus at 100% elongation which is higher than desired for many sealant applications. Unexpectedly, it has been found that addition of a modulus reducing additive comprising at least one of rosin esters, hydrogenated rosin esters, or mixtures thereof, reduces the modulus of sealant formulations including fillers with higher particle size. Modulus values are not as important for adhesives, particularly floor adhesives for indoor use, which are typically not subjected to extreme expansion and contraction due to changes in the weather.

In certain embodiments, while not required, a solvent can be used to aid processing and/or as a diluent. In certain embodiments, the plasticizer can function both as a plasticizer and a solvent. In certain embodiments the amount of plasticizer (solvent) may be from about 5 to about 30 weight percent. For purposes of illustration but not by way of limitation, suitable examples of solvents include, but are not limited to, alkyl oleates, biodiesel, aliphatic hydrocarbons such as mineral spirits, aromatic hydrocarbons such as toluene, xylene, solvent naphtha, and Aromatic 100, esters such as ethyl acetate, butyl acetate, and propylene glycol diacetate, ethers such as dipropylene glycol dimethyl ether, ketones such as methyl ethyl ketone, methyl isobutyl ketone, and cyclohexanone, and mixtures thereof.

Antioxidants, UV absorbers, stabilizers, mildewcides, biocides, and fungicides are materials known to those skilled in the art, and protect the sealant and adhesive formulations from harmful effects of weathering and biological agents.

In certain embodiments, an antioxidant may be added to the sealant or adhesive formulations to improve the long-term oxidation resistance. For purposes of illustration but not by way of limitation, antioxidants may comprise, among others, alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, benzylphosphonates, acylaminophenols, esters of beta-(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl) propionic acid with mono- or polyhydric alcohols, esters of 3,5-di-tert-butyl-4-hydroxyphenyl acetic acid with mono- or polyhydric alcohols, amides of beta-(3,5-di-tert-butyl-4-hydroxyphenyl)propionic acid, ascorbic acid and derivatives, aminic antioxidants, and mixtures thereof. If used, the amount of antioxidant in certain embodiments may be about 0.1 to about 2 weight percent, based on the total weight of the polyurethane formulation. For purposes of illustration but not by way of limitation, various commercially available antioxidants may be used, such as IRGANOX1076, an octadecyl 3,5-di-tert-butyl 4 hydroxyhydrocinnamate marketed by Ciba Corporation.

In certain embodiments, UV stabilizers may be included in the adhesive or sealant formulation. For purposes of illustration but not by way of limitation, UV stabilizers may comprise, among others, 2-(2'-hydroxyphenyl)benzotriazoles, 2-hydroxybenzophenones, esters of substituted and unsubstituted benzoic acids, acrylates, nickel compounds, sterically hindered amines, oxanilides, 2-(2-hydroxyphenyl)-1,3,5-triazines, and mixtures thereof.

For purposes of illustration but not by way of limitation, fungicides, mildewcides, and biocides, if used in the adhesive or sealant formulation, may comprise, among others, 4,4-dimethyloxazolidine, 3,4,4-trimethyloxazolidine, modified barium metaborate, potassium N-hydroxy-methyl-N-methyldithiocarbamate, 2-(thiocyanomethylthio)benzothiazole, potassium dimethyl dithiocarbamate, adamantane, N-(trichloromethylthio)phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, copper 8-quinolinate, and mixtures thereof.

In certain embodiments, fire retardants may be used in the adhesive or sealant formulations. Fire retardants may comprise any material that provides self extinguishing properties. For purposes of illustration but not by way of limitation, the fire retardant may include phosphates such as triphenyl phosphate, polyammonium phosphate, monoammonium phosphate, or tri(2-chloroethyl)phosphate, exfoliated graphite, acid treated natural graphite flakes, and mixtures thereof. The fire retardant may be a liquid or a solid. A solid fire retardant may be ground to a micron size, typically referred to by those skilled in the art as micronized. Additionally, the fire retardant may include but is not limited to self extinguishing agents and flame retardants.

In certain embodiments, the adhesive or sealant formulations may also comprise a coloring agent, such as a pigment or a dye, to provide a desired color to the formulation. For purposes of illustration but not by way of limitation, coloring agents may include carbon black and titanium dioxide which may be in the rutile form, but other coloring agents may also be useful. Carbon black and titanium dioxide may act as both pigments and fillers in the formulation. For purposes of illustration but not by way of limitation, additional examples of pigments include, but are not limited to, barium sulfate, zinc oxide, zinc sulfide, basic lead carbonate, antimony trioxide, lithopones (zinc sulfide and barium sulfate), inorganic color pigments such as iron oxides, carbon black, graphite, luminescent pigments, zinc yellow, zinc green, ultramarine, manganese black, antimony black, manganese violet, Paris blue, and Schwednfurter green, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, isoindolinone, and metal complex pigments, and mixtures thereof.

In certain embodiments, the adhesive or sealant formulations may additionally comprise surface additives such as flow and leveling additives, wetting agents, and dispersing agents to facilitate application of the material. For purposes of illustration but not by way of limitation, examples of flow and leveling additives, wetting agents, and antifoaming agents may include silicones, modified silicones, polyacrylates, and hydrocarbons such as petroleum components and mixtures. For purposes of illustration but not by way of limitation, examples of suitable flow additives may include, but are not limited to, polyester modified acrylic functional poly-di-methyl siloxanes such as BYK®-371, BYK® P-104, and polyacrylate copolymers such as BYK®-358, (all available from BYK-Chemie USA, Wallingford, Conn.), and fluorosurfactants such as 3M™ FLUORAD™ FC-4430 Fluomosurfactant (available from 3M Company, St. Paul, Minn.).

In certain embodiments, adhesion promoters may also be used in the adhesive or sealant formulations. For purposes of illustration but not by way of limitation, adhesion promoters may include, but are not limited to, at least one of 2-aminoethyl-dimethylmethoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane, 5-aminopentyl-triethoxysilane, 3-aminopropyl-triisopropoxysilane, γ-glycidoxypropyltrimethoxysilane, γ-glycidoxypropyltriethoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysilyl)popyl]urea, 1-[3-(triethoxysilyl)propyl]urea, [3-(2-aminoethylamino)propyl] trimethoxysilane, [3-(2-aminoethylamino)propyl] triethoxysilane, 2-(3,4-epoxycyclohexyl)ethyl-trimethoxysilane, 2-(3,4-epoxycyclohexyl)ethyl-triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl] methyl dimethoxysilane, [3-(2-aminoethylamino)propyl] methyl diethoxysilane, 3-glycidoxypropyl methyldimethoxysilane, or 3-glycidoxypropyl-methyldiethoxysilane, or combinations thereof.

One or more storage stabilizers can be used, including para toluene sulfonyl isocyanate (PTSI).

One or more latent hardeners which are inactive at room temperature but act as a curing agent at elevated temperatures may be used, including, but not limited to, blocked amines.

One or more conventional catalysts which accelerate the isocyanate-polyol reaction may be used, including tertiary amines, organo metallic compounds or mixtures thereof.

In certain embodiments, organo metallic compounds such as tin compounds may be used as catalysts. For purposes of illustration but not by way of limitation, organo metallic compounds such as stannous octoate, stannous chloride, dibutyltin dilaurate, dibutyltin diacetate, dibutyltin-di-2 ethyl hexoate and the like, or other suitable organo metallic compounds such as bismuth octoate, zinc octoate and the like may be used as catalysts.

In certain embodiments, one or more conventional tertiary amine catalysts may be used. For purposes of illustration but not by way of limitation, tertiary amines may include triethylenediamine, dimethylethanolamine, triethanolamine, N-ethyl morpholine, N-methyldicyclohexylamine, N,N-dimethyl cyclohexylamine, N,N,N',N'-tetramethyl-1,3-butanediamine, ether and the like.

The amount of catalysts, if used, may be in certain embodiments about 0.05 to about 1 weight percent and in certain embodiments about 0.1 to about 0.4 weight percent, based on the total weight of the formulation.

In certain embodiments, a complexing agent which reacts with the catalyst to slow down its reactivity after the polyurethane formulation has been packaged may be used. For purposes of illustration but not by way of limitation, the complexing agent may comprise diethyl malonate. In certain embodiments, the amount of the complexing agent may typically be about 0.05 to about 1.5 weight percent, and in certain embodiments about 0.1 to about 0.5 weight percent, based on the total weight of the formulation.

In certain embodiments, to avoid the inclusion of water during processing, an alkaline earth metal oxide, such as calcium oxide or calcium sulfate, may be included in the formulation as a de-watering agent, i.e., drying agent, for scavenging water from the formulation.

The additional polyurethane components may be incorporated separately or may be combined with any reaction component.

The additional ingredients may be mixed by conventional means, such as in an inert, dry atmosphere. The ingredients may be mixed together all at one time (in a "one stage" process); alternatively, some ingredients and/or portions of ingredients may be mixed together in one operation (or "stage"), with other ingredients and/or portions of ingredients added in an additional stage or stages. Normally, the ingredients may be heated above room temperature. The ingredients may be heated before, during, or after the process of mixing. If more than one stage of addition of ingredients and/or mixing and/or heating is used, the mixture of one stage may be heated for a time before the next stage is added. Typical temperature of heating is about 65° C. to about 85° C. If more than one stage is used, the temperature of each stage may be chosen independently. During any of the mixing and/or heating stages, full or partial vacuum may be applied; also nitrogen gas or other dry and/or inert gas may be used to blanket the surface of the mixture. In addition, a catalyst may optionally be admixed with the ingredients, either before, during, or after any one or more of the stages of mixing the ingredients. The formulation is stored, in certain embodiments under an inert, dry atmosphere until use.

The adhesive is used to adhere a first substrate to a second substrate by dispensing the adhesive from a caulking gun, or by spraying, brushing, rolling, squeegeeing, scraping, troweling, and combinations thereof.

The adhesive or sealant formulations may be applied to a substrate, such as the surface of at least one of concrete, stone, metal, ceramic, glass, plastic, wood, asphalt, vinyl, carpet, thermoplastic materials, thermoset materials, rubber or composite materials by techniques known in the art, prior to the cure of the formulation. The substrates to be bonded may be the same or different.

Improved performance is typically obtained for firm, clean and dry load bearing substrate surfaces free of loose and brittle particles, and without substances which impair adhesion such as oil, grease, rubber skid marks, paint, or other contaminants. Surface preparation before application of the formulation as an adhesive or sealant can include water-blasting, sandblasting, cleaning, drying and the like.

The applied formulation is subjected to moisture which will allow the formulation to cure to an irreversible solid form. Moisture may take the form of ambient humidity, artificially increased or controlled humidified air, a mist of water droplets, a spray of liquid water contacting the applied formulation, or combinations thereof.

Advantageously, the adhesive and sealant formulations are both paintable and cleanable even after curing. Typically, urethane adhesives are not cleanable when cured and on the surface of the finished wood, and sealants typically are not paintable in the absence of a primer.

The following Examples are provided to illustrate, but not limit, the preparation of the adhesive and sealant formulations and their corresponding polyurethane prepolymers, as discussed above. Prepolymer was synthesized using bio based polyols, isophorone diisocyanate, amine catalyst, DINCH and PTSI. Sealant and adhesive formulations including an ester of hydrogenated rosin (i.e., Foralyn 90) and corresponding comparative formulations lacking an ester of hydrogenated rosin were prepared. The mechanical properties of the sealants and adhesives were tested and evaluated. The results demonstrate the effect of the presence and absence of Foralyn™ 90 modulus reducing additive on modulus under various conditions.

EXAMPLE 1

General Formulation of the Sealant

Table 1A below indicates ranges of components of a representative formulation for synthesizing the sealant.

TABLE 1A

| Component | Percent |
| --- | --- |
| Prepolymer | 35-40% |
| Calcium Oxide (drying agent) | 1-3% |
| Diethyl Malonate (DEM) (blocking agent) | 0.1-0.5% |
| Thixocarb 500 (filler) | 35-43% |
| LA-7 or LA 300 (recycled glass filler) | 10-12% |
| Kotamite (filler) | 10-12% |
| Foralyn 90 (hydrogenated Rosin ester) (modulus reducer) | 1-5% |
| $TiO_2$ (Pigment) | 3-5% |
| Disparlon 6100 or 6200 (rheological additive) | 2-4% |
| Lowinox 44B25 (antioxidant) | 0.1-0.4% |
| SILANE, Silquest A187 (adhesion promoter) | 0.1-0.5% |
| UV & light stabilizers | 0.1-0.5% |
| DINCH (plasticizer) | 1-8% |
| Incozol NC (moisture scavenger) | 0.2-0.6% |
| Dabco BL-19 (catalyst) | 0.3-1% |

LOWINOX 44B25, a 4,4'-butylidenebis[2-(1,1-dimethethyl)-5-methylphenol] is an antioxidant marketed by Lowi Chemical.
Foralyn 90 (F-90) available from Eastman Chemical Company.
Kotamite available from Imerys Performance Minerals North America.
Disparlon available from Kusumoto Chemicals, Ltd.
SILANE, Silquest A187 available from Crompton OSi Specialties.

Table 1B below indicates ranges of components of a representative formulation for synthesizing the polyurethane prepolymer.

TABLE 1B

| Component | Range (Wt %) |
| --- | --- |
| Vertellus Polycin ® polyol (GR-35) | 45-62% |
| Balance 50 | 15-22% |
| IPDI | 10-22% |
| Dabco 33LV or Dabco BL-19 | 0.05-1% |
| DINCH | 5-15% |
| PTSI | 0.5-3% |

The NCO:OH ratio was in the range of 1.75:1 to 2.1:1. Percent of NCO in the prepolymer was in the range of 1.75% to 2.8%.

Procedure:

Both polyols were introduced into the reactor and mixed for 10 minutes. DINCH was added. After blending DINCH with polyols, the moisture of the batch was measured by Karl Fisher titration and if the polyol mixture has low moisture, no extra IPDI amount is added. If required, an extra amount of IPDI needed to compensate for moisture was calculated and added to the amount of IPDI needed for reacting with polyols at an NCO:OH ratio of 1.8:1. The IPDI was added to the mixture and the batch heated to 74° F. The required amount of Dabco catalyst was added. Heat was generated from the exothermic reaction between the isocyanate and polyol. The temperature was maintained at 165° F. and the reaction allowed to proceed for 3-4 hours, at which time a sample was withdrawn to measure the experimental NCO % to determine if it was close to the theoretical NCO %. The NCO % measurements were taken by 0.1N HCl Titration using an automatic titrator, as per ASTM D-2572-80 (Test method for Isocyanate Groups in Urethane Prepolymers). The heat was turned off and the batch allowed to cool down when the experimental NCO % approached the theoretical (with a standard deviation of ±0.2). When the temperature was between 120-125° F., the required amount of PTSI drying agent was added, and the mixture was mixed for about 30 minutes. The batch was then emptied.

General Procedure for Preparing the Sealant

The prepolymer was added to the Ross mixer followed by Calcium Oxide. The batch was mixed well for 10 minutes at 600 rpms. Diethyl Malonate was added to the batch and mixed for 10 minutes at 500 rpm. Kotamite or LA-7 or LA-300 recycled fillers were added, as well as Thixocarb 500, $TiO_2$ and F-90, and the batch mixed for 15 minutes at 900 rpm. Lowinox 42B25, A187, UV and light stabilizers and DINCH were added and the batch mixed for 10 minutes at 600 rpm. Disparlon was added and the batch mixed for 10 minutes at 600 rpm. The batch was then heated to 165° F. for the activation of the rheological additive. The blade was then mixed for 45-60 minutes at 600 rpm under vacuum. The batch was then cooled to 90° F. Incazol NC and Dabco BL-19 catalyst were added. The batch was mixed for 5 minutes at 600 rpm before applying vacuum. Mixing was continued for 10 minutes under vacuum. The batch was then emptied.

Viscosity was measured at between 3500-8500 poise at 24° C.

Sag, inch was measured at between 0-0.18 inch.

EXAMPLE 2

Formulation of Sealant

A polyurethane sealant was prepared in accordance with the formulation shown in Table 2.

TABLE 2

| Component | Weight (g) |
| --- | --- |
| Prepolymer of Example 1 | 39.50 |
| Calcium Oxide | 1.95 |
| Thixocarb 500 | 49.55 |
| Foralyn-90 | 1.5 |
| $TiO_2$ R902 | 3.95 |
| DINCH | 2.5 |
| Incozol NC | 0.45 |
| Dabco BL-19 | 0.6 |
| Total | 100 |

Procedure:

The prepolymer was added to the Ross mixer followed by Calcium Oxide drying agent. The batch was mixed well for 10 minutes at 600 rpms. Thixocarb 500 filler, Foralyn-90, $TiO_2$ R902 pigment from DuPont and Hexamoll® DINCH plasticizer from BASF were added and the batch mixed for 10 minutes at 600 rpms. The batch was then heated to 170° F. The blade was then increased to 900 rpm and the batch mixed for 1.5 hours under vacuum. The batch was then cooled to 90° F. Incazol NC moisture scavenger, Dabco BL-19 catalyst, and additional DINCH plasticizer were added. The batch was mixed for 5 minutes before applying vacuum. Mixing was continued for 10 minutes under vacuum. The batch was then emptied.

| | Upon preparation | After 1 week in 140° F. oven |
| --- | --- | --- |
| Viscosity (poise) | 3800 | 13420 |
| Sag, inch | 0.16 | 0.38 |

FIG. 1 is a graphical representation of the results of an ASTM D412 Tensile Test for the Sealant of Example 2. Test results for multiple samples, including maximum load, tensile strength, tensile strength at maximum load, 100% modulus (psi), elongation (%) and thickness, are set forth below:

TEST RESULTS FOR SEALANT OF EXAMPLE 2

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 5.0 | 261.0 | 733.33 | 64.62 | 734.90 | 0.076 |
| 2 | 4.5 | 224.1 | 680.00 | 64.39 | 681.67 | 0.080 |
| 3 | 3.5 | 190.9 | 658.33 | 58.24 | 658.33 | 0.074 |
| 4 | 4.7 | 250.5 | 705.00 | 67.72 | 708.33 | 0.075 |
| 5 | 6.6 | 328.0 | 806.67 | 68.90 | 806.67 | 0.080 |
| Mean | 4.8 | 250.9 | 716.67 | 64.77 | 717.98 | 0.077 |
| Std. Dev. | 1.09917 | 50.90093 | 57.57833 | 4.14007 | 57.27347 | 0.00283 |

The test data shows the tensile performance of the sealant, and demonstrates that the sealant has very good average tensile strength of 250.9 psi, elongation at break of 718%, 100% modulus of 64.8 psi, and a shore A hardness of 36. The test data demonstrates that it is a high performing, low modulus elastomeric sealant which can have a high movement capability.

EXAMPLE 3

Formulation of Sealants 3A and 3B

Polyurethane Sealants 3A and 3B were prepared in accordance with the formulations shown in Table 3A, based on a prepolymer prepared in accordance with Table 3B. Sealant 3A includes an ester of hydrogenated rosin (Foralyn-90) in the formulation whereas Sealant 3B lacks an ester of hydrogenated rosin in the formulation. Modulus data for Sealants 3A and 3B is provided for 7 and 14 day curing.

TABLE 3A

|  | SEALANT 3A | | SEALANT 3B | |
|---|---|---|---|---|
| Component | % | Weight (g) | % | Weight (g) |
| Prepolymer of Table 3B | 39.50% | 1264 g | 39.50% | 1264 g |
| Calcium Oxide | 2.32% | 74.24 g | 2.32% | 74.24 g |
| Kotamite | 10.27% | 328.64 g | 10.78% | 344.96 g |
| Thixocarb 500 | 39.50% | 1264 g | 40.50% | 1296 g |
| Foralyn-90 | 1.50% | 48 g | 0 | 0 |
| TiO$_2$ (R902) | 4.01% | 128.32 g | 4.00% | 128 g |
| DINCH | 1.85% | 59.2 g | 1.85% | 59.2 g |
| Incozol NC | 0.45% | 14.4 g | 0.45% | 14.4 g |
| Dabco BL-19 | 0.60% | 19.2 g | 0.60% | 19.2 g |
| Total | 100 | 3,200 | 100 | 3,200 |

Sealants 3A and 3B: NCO:OH ratio of 1.8:1 and a Diol/Triol ratio of 2.9.

Procedure for Preparation of Sealants 3A and 3B:

The prepolymer and the Calcium Oxide drying agent were added to the Ross mixer. The batch was mixed well for 10 minutes at 600 RPM. Kotamite, Thixocarb 500 filler, F90 (for Sealant 3A formulation), TiO$_2$ R902 pigment from DuPont and Hexamoll® DINCH plasticizer from BASF were added and the batch mixed for 10 minutes at 600 RPM. The batch was then heated to 170° F. The blade was increased to 900 RPM and the batch mixed for 90 minutes under vacuum. The batch was cooled to 90° F. Incazol NC moisture scavenger and Dabco BL-19 catalyst were added. The batch was mixed for 5 minutes before applying vacuum. Mixing was continued for 10 minutes under vacuum. The batch was then emptied.

|  | SEALANT 3A | | SEALANT 3B | |
|---|---|---|---|---|
|  | Upon Preparation | After 1 week in 140° F. oven | Upon Preparation | After 1 week in 140° F. oven |
| Viscosity (poise) | 5680 | 10420 | 5980 | 12480 |
| Sag (inch) | 0.2 | | 0.18 | |
| Density (lbs/gal) | 12.67 | | 12.79 | |

TABLE 3B

| Prepolymer | | |
|---|---|---|
| Component | Percent | 2800.00 g. Batch |
| Polycin GR-35 | 60.03 | 1680.84 |
| Lupranol ® Balance 50 | 20.70 | 579.60 |
| DINCH | 5.80 | 162.4 |
| IPDI | 11.27 | 315.56 |
| Dabco 33LV | 0.20 | 5.6 |
| PTSI | 2.00 | 56 |
| Total | 100 | 2800 |

Procedure for Preparation of the Prepolymer Used in Sealants 3A and 3B:

The above reactants, except PTSI, were heated to a temperature of 158° F. (70° C.) and mixed at 450 RPM in a 3 L flask under N$_2$ atmosphere. The reactants were allowed to exotherm to 165-170° F. and the reaction allowed to proceed for 3-4 hours, at which time a sample was withdrawn to measure the experimental NCO % to determine if it was close to the theoretical NCO %. The NCO % measurements were taken by 0.1N HCl Titration using an automatic titrator, as per ASTM D-2572-80 (Test method for Isocyanate Groups in Urethane Prepolymers). The heat was turned off and the batch allowed to cool down when the experimental NCO % approached the theoretical (with a standard deviation of ±0.2). The theoretical NCO % was 1.91657%; the NCO % measurement was 1.836%. When the temperature was between 120-125° F., the required amount of PTSI drying agent was added, and the mixture was mixed for about 30 minutes. The batch was then emptied. The viscosity of the prepolymer was measured at 157 poise at 24° C. (72° F.).

Figure 2:
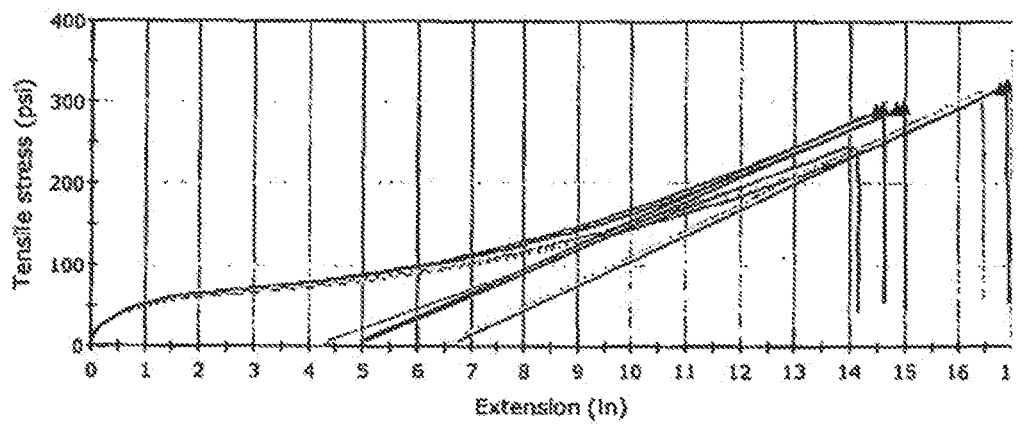
FIG. 2 is a graphical representation of the results of an ASTM D412 Tensile Test (7 day cure) for the Sealant 3A.
Figure 3:
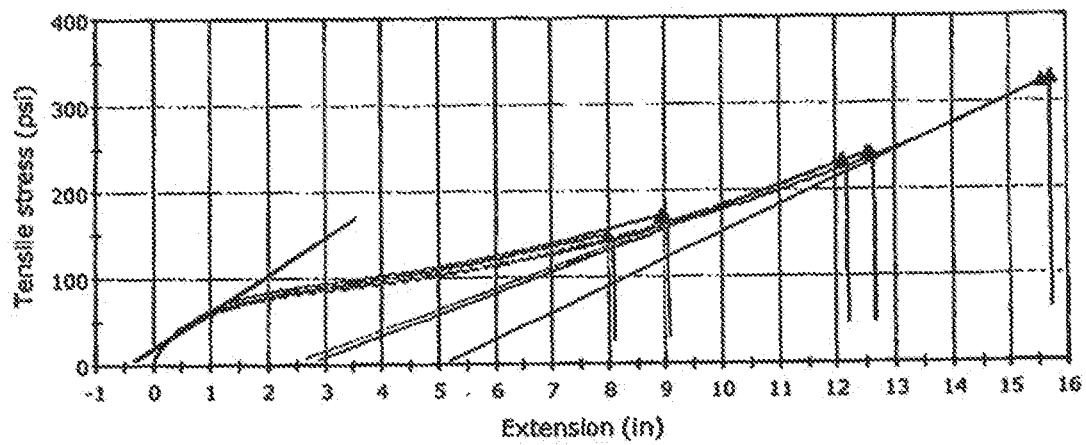
FIG. 3 is a graphical representation of the results of an ASTM D412 Tensile Test (14 day cure) for the Sealant 3A.
Figure 4:
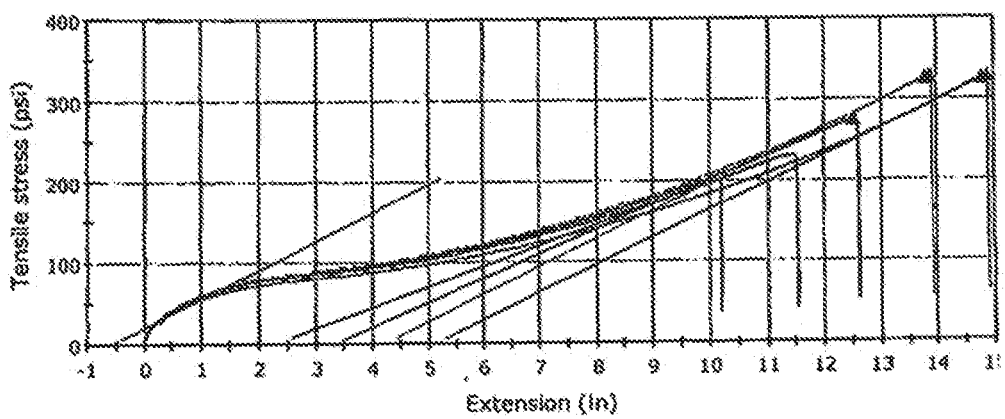
FIG. 4 is a graphical representation of the results of an ASTM D412 Tensile Test (7 day cure) for the Sealant 3B.
Figure 5:
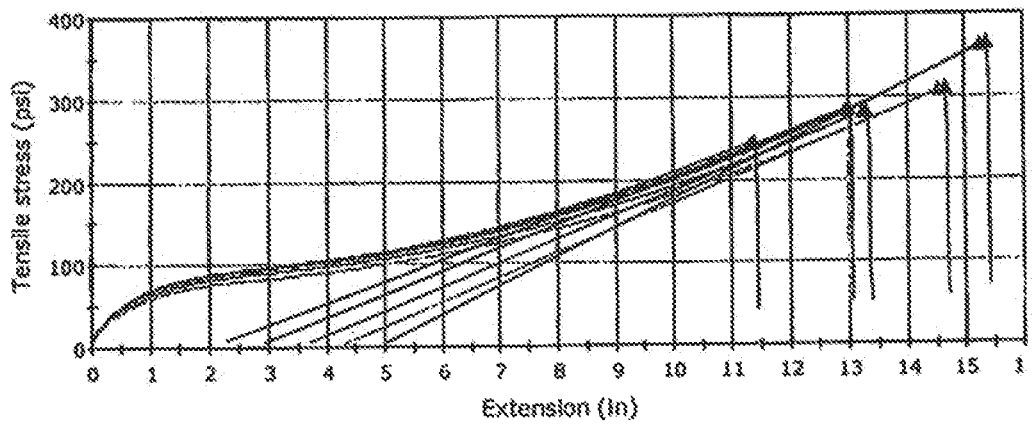
FIG. 5 is a graphical representation of the results of an ASTM D412 Tensile Test (14 day cure) for the Sealant 3B.

FIG. 2 is a graphical representation of the results of an ASTM D412 Tensile Test (7 day, standard cure) for Sealant 3A and FIG. 3 is a graphical representation of the results of an ASTM D412 Tensile Test (14 day, standard cure) for Sealant 3A. FIG. 4 is a graphical representation of the results of an ASTM D412 Tensile Test (7 day, standard cure) for Sealant 3B and FIG. 5 is a graphical representation of the results of an ASTM D412 Tensile Test (14 day, standard cure) for Sealant 3B. Test results for multiple samples, including maximum load, tensile strength, tensile strength at maximum load (%), 100% modulus (psi), elongation (%) and thickness (in), are set forth in the charts below:

| SEALANT 3A TEST RESULTS (7 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 2.8 | 292.1 | 730.00 | 65.86 | 731.40 | 0.039 |
| 2 | 4.1 | 319.9 | 845.00 | 61.28 | 845.00 | 0.051 |
| 3 | 2.8 | 243.8 | 701.67 | 63.10 | 706.67 | 0.046 |
| 4 | 3.9 | 312.0 | 820.00 | 62.40 | 821.67 | 0.050 |
| 5 | 3.2 | 294.1 | 748.33 | 65.83 | 749.83 | 0.043 |
| Mean | 3.4 | 292.4 | 769.00 | 63.69 | 770.91 | 0.046 |
| Std. Dev. | 0.59577 | 29.61419 | 60.94853 | 2.07018 | 59.57776 | 0.00497 |

The test data shows the tensile performance of Sealant 3A (7 day, standard cure), and demonstrates that the sealant has very good average tensile strength of 292.4 psi, elongation at break of 770.91%, 100% modulus of 63.69 psi, and a Shore A hardness of 25.0. The test data demonstrates that it is a high performing elastomeric sealant with low modulus which has a high movement capability.

| SEALANT 3A TEST RESULTS (14 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 3.7 | 328.4 | 785.00 | 77.00 | 785.00 | 0.045 |
| 2 | 1.5 | 169.8 | 446.67 | 84.26 | 451.67 | 0.035 |
| 3 | 2.5 | 240.9 | 630.00 | 78.96 | 631.67 | 0.041 |
| 4 | 2.5 | 232.7 | 605.00 | 78.33 | 608.33 | 0.043 |
| 5 | 1.3 | 147.6 | 398.33 | 79.72 | 403.33 | 0.036 |
| Mean | 2.9 | 267.3 | 673.33 | 78.10 | 675.00 | 0.043 |
| Std. Dev. | 0.69836 | 53.05272 | 97.51078 | 1.00103 | 95.97450 | 0.00200 |

The test data shows the tensile performance of Sealant 3A (14 day, standard cure) and demonstrates that the sealant has very good average tensile strength of 267.3 psi, elongation at break of 675.00%, 100% modulus of 78.10 psi, and a Shore A hardness of 20.8. The test data demonstrates that it is a low modulus, high performing elastomeric sealant which can have a high movement capability.

| SEALANT 3B TEST RESULTS (7 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 2.8 | 230.4 | 573.33 | 76.24 | 576.67 | 0.048 |
| 2 | 4.6 | 327.5 | 743.33 | 72.53 | 745.00 | 0.056 |
| 3 | 2.3 | 203.6 | 510.00 | 77.46 | 510.00 | 0.046 |
| 4 | 3.9 | 327.0 | 693.33 | 80.06 | 695.00 | 0.048 |
| 5 | 3.6 | 274.5 | 626.67 | 77.70 | 630.00 | 0.052 |
| Mean | 3.4 | 272.6 | 629.33 | 76.80 | 631.33 | 0.050 |
| Std. Dev. | 0.89790 | 55.95138 | 92.83784 | 2.75851 | 93.12020 | 0.00400 |

The test data shows the tensile performance of Sealant 3B (7 day, standard cure), and demonstrates that the sealant has very good average tensile strength of 272.6 psi, elongation at break of 631.33%. 100% modulus of 76.80 psi, and a Shore A hardness of 29.8. The test data demonstrates that it is a medium performing elastomeric sealant which has a reduced movement capability (76.80 vs. 63.69 psi) as compared to the Sealant 3A including Foralyn 90.

SEALANT 3B TEST RESULTS (14 day, standard cure)

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 4.9 | 365.2 | 768.33 | 86.02 | 769.63 | 0.054 |
| 2 | 3.0 | 245.0 | 570.00 | 87.99 | 571.67 | 0.049 |
| 3 | 4.0 | 282.4 | 665.00 | 81.60 | 668.03 | 0.057 |
| 4 | 4.5 | 309.6 | 733.33 | 75.75 | 734.90 | 0.058 |
| 5 | 4.0 | 284.1 | 650.00 | 86.35 | 651.67 | 0.056 |
| Mean | 4.4 | 310.3 | 704.17 | 82.43 | 706.06 | 0.056 |
| Std. Dev. | 0.44754 | 38.64282 | 56.08348 | 4.95074 | 55.61174 | 0.00171 |

The test data shows the tensile performance of Sealant 3B (14 day, standard cure), and demonstrates that the sealant has very good average tensile strength of 310.3 psi, elongation at break of 706.06%, 100% modulus of 84.43 psi, and a Shore A hardness of 32.1. The test data demonstrates that it is a medium performing elastomeric sealant which has a reduced movement capability (82.43 vs. 78.1 psi) as compared to Sealant 3A including Foralyn 90.

EXAMPLE 4

Formulation of Sealants 4A and 4B

Polyurethane Sealants 4A and 4B were prepared in accordance with the formulations shown in Table 4A, based on a prepolymer prepared in accordance with Table 4B. Sealant 4A includes an ester of hydrogenated rosin (Foralyn-90) in the formulation whereas Sealant 4B lacks an ester of hydrogenated rosin in the formulation. Modulus data for Sealants 4A and 4B is provided for 7 and 14 day curing.

TABLE 4A

|  | SEALANT 4A | | SEALANT 4B | |
|---|---|---|---|---|
| Component | % | Weight (g) | % | Weight (g) |
| Prepolymer | 39.50% | 1264 g | 39.50% | 1264 g |
| Calcium Oxide | 2.32% | 74.24 g | 2.32% | 74.24 g |
| Kotamite | 10.27% | 328.64 g | 10.78 | 344.96 g |
| Thixocarb 500 | 39.50% | 1264 g | 40.50% | 1296 g |
| Foralyn-90 | 1.50% | 48 g | 0 | 0 |
| TiO$_2$ (R902) | 4.01% | 128.32 g | 4.00% | 128 g |
| DINCH | 1.85% | 59.2 g | 1.85% | 59.2 g |
| Incozol NC | 0.45% | 14.44 g | 0.45% | 14.4 g |
| Dabco BL-19 | 0.60% | 19.2 g | 0.60% | 19.2 g |
| Total | 100 | 3,200 | 100 | 3,200 |

Sealants 4A and 4B: The NCO:OH ratio of the prepolymer used to make Sealants 4A and 4B was 1.8:1 and the Diol/Triol ratio was 2.9. The procedure for preparing of Sealants 4A and 4B was similar to that of Example 3.

|  | SEALANT 4A | | SEALANT 4B | |
|---|---|---|---|---|
|  | Upon Preparation | After 1 week in 140° F. oven | Upon Preparation | After 1 week in 140° F. oven |
| Viscosity (poise) | 6100 | 8740 | 9120 | 18280 |
| Sag (inch) | 0.25 | | 0.05 | |

-continued

|  | SEALANT 4A | | SEALANT 4B | |
|---|---|---|---|---|
|  | Upon Preparation | After 1 week in 140° F. oven | Upon Preparation | After 1 week in 140° F. oven |
| Density (lbs/gal) | 12.71 | | 12.81 | |

TABLE 4B

|  | Prepolymer used in Sealant 4A | | Prepolymer Used in Sealant 4B | |
|---|---|---|---|---|
| Component | Percent | 2800.00 g. Batch | Percent | 2800.00 g. Batch |
| Polycin GR-35 | 59.75 | 1673.0 | 59.75 | 1673.0 |
| Lupranol ® Balance 50 | 20.60 | 576.8 | 20.60 | 576.8 |
| DINCH | 5.79 | 162.12 | 5.79 | 162.12 |
| IPDI | 11.45 | 320.6 | 11.45 | 320.6 |
| Dabco BL-19 | 0.40 | 11.2 | 0.40 | 11.2 |
| PTSI | 2.00 | 56 | 2.00 | 56 |
| Total | 100 | 2800 | 100 | 2800 |

Procedure: The Polyurethane Prepolymers were Prepared Following the Procedure of Example 3.

For the Prepolymer used in Sealant 4A, the theoretical NCO % was 1.948%; the NCO % measurement was 1.816%. The viscosity was measured at 202 poise at 24° C. (72° F.).

For the Prepolymer Used in Sealant 4B, the theoretical NCO % was 1.948%; the NCO % measurement was 1.865%. The viscosity was measured at 244 poise at 24° C. (72° F.).

Figure 6:
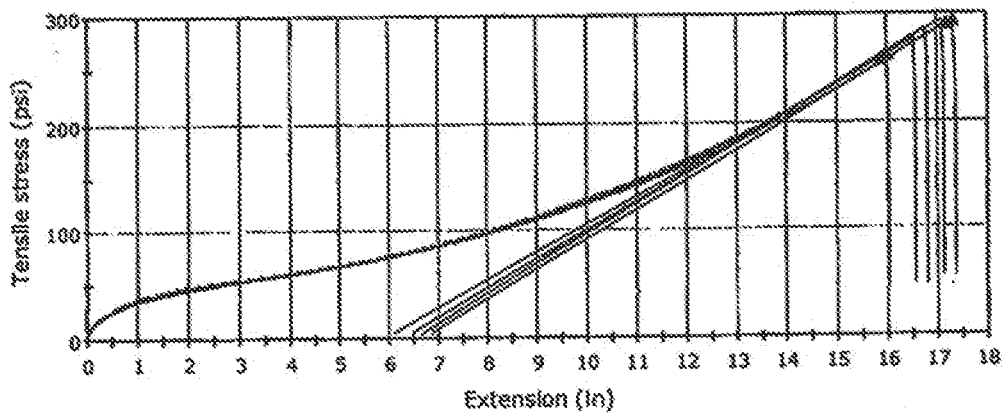
FIG. 6 is a graphical representation of the results of an ASTM D412 Tensile Test (7 day cure) for the Sealant 4A.
Figure 7:
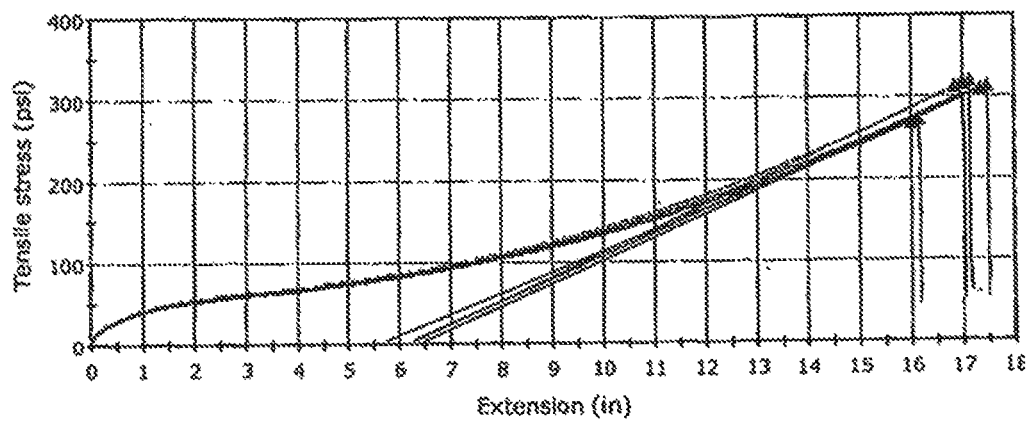
FIG. 7 is a graphical representation of the results of a second ASTM D412 Tensile Test (14 day cure) for the Sealant 4A.
Figure 8:
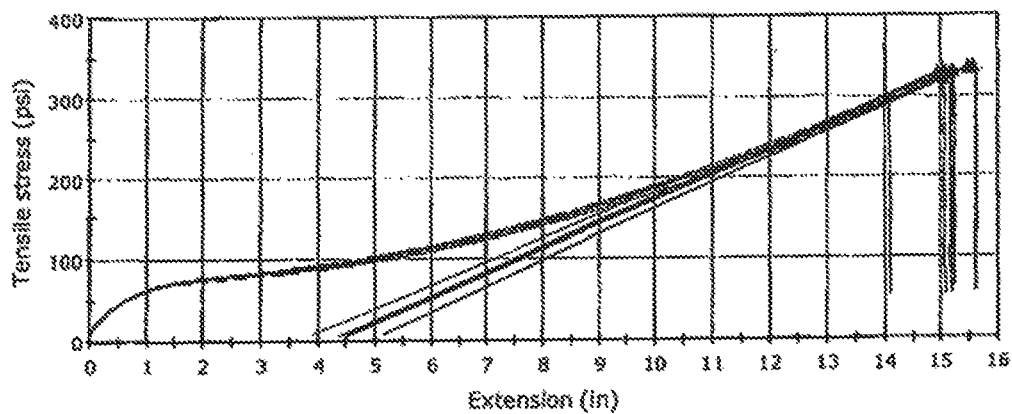
FIG. 8 is a graphical representation of the results of an ASTM D412 Tensile Test (7 day cure) for the Sealant 4B.
Figure 9:
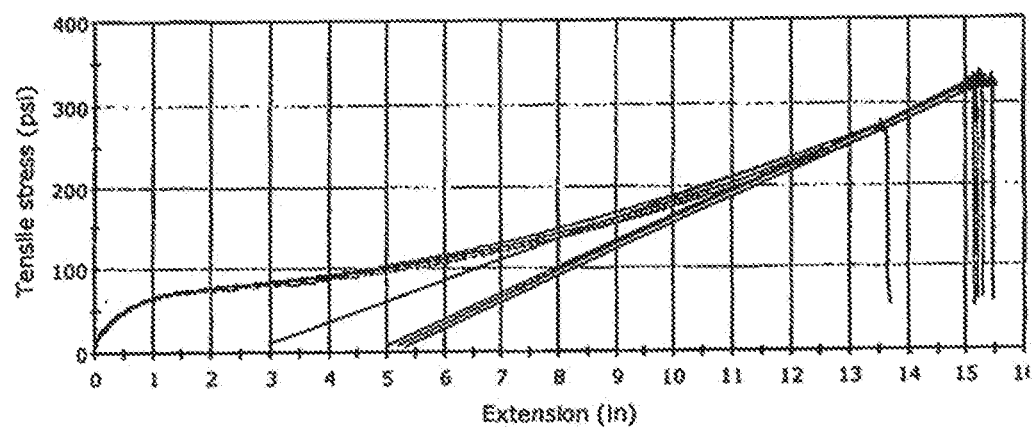
FIG. 9 is a graphical representation of the results of an ASTM D412 Tensile Test (14 day cure) for the Sealant 4B.

FIG. 6 is a graphical representation of the results of an ASTM D412 Tensile Test (7 day, standard cure) for Sealant 4A and FIG. 7 is a graphical representation of the results of an ASTM D412 Tensile Test (14 day, standard cure) for Sealant 4A. FIG. 8 is a graphical representation of the results of an ASTM D412 Tensile Test (7 day, standard cure) for Sealant 4B and FIG. 9 is a graphical representation of the results of an ASTM D412 Tensile Test (14 day, standard cure) for Sealant 4B. Test results for multiple samples, including maximum load, tensile strength, tensile strength at maximum load (%), 100% modulus (psi), elongation (%) and thickness (in), are set forth in the charts below:

| SEALANT 4A TEST RESULTS (7 day, standard cure) | | | | | |
|---|---|---|---|---|---|
| Maximum Load (lbf) | Tensile Strength (psi) | Tensile strain at Maximum Load (%) | 100% Modulus (psi) | Elongation (%) | Thickness (in) |
| 1  4.0 | 293.7 | 866.67 | 46.82 | 868.23 | 0.055 |
| 2  3.9 | 285.7 | 838.33 | 46.20 | 840.00 | 0.054 |
| 3  3.6 | 260.3 | 800.00 | 48.57 | 800.00 | 0.055 |
| 4  4.2 | 293.1 | 855.00 | 47.96 | 855.00 | 0.057 |
| 5  3.5 | 276.3 | 826.67 | 44.90 | 828.27 | 0.051 |
| Mean  3.8 | 281.8 | 837.33 | 46.89 | 838.30 | 0.054 |
| Std. Dev.  0.28367 | 13.94913 | 25.88984 | 1.45155 | 26.19808 | 0.00219 |

The test data shows the tensile performance of the sealant, and demonstrates that the sealant has very good average tensile strength of 281.8 psi, elongation at break of 838.30%, 100% modulus of 46.89 psi, and a Shore A hardness of 19.1. The test data demonstrates that it is a high performing elastomeric sealant which can have a high movement capability.

| SEALANT 4A TEST RESULTS (14 day, standard cure) | | | | | |
|---|---|---|---|---|---|
| Maximum Load (lbf) | Tensile Strength (psi) | Tensile strain at Maximum Load (%) | 100% Modulus (psi) | Elongation (%) | Thickness (in) |
| 1  3.9 | 271.4 | 806.67 | 52.37 | 806.67 | 0.057 |
| 2  4.1 | 302.3 | 850.00 | 55.33 | 851.23 | 0.054 |
| 3  4.1 | 318.0 | 856.67 | 55.79 | 856.67 | 0.051 |
| 4  4.3 | 315.3 | 850.00 | 56.20 | 850.00 | 0.054 |
| 5  4.4 | 311.0 | 873.33 | 54.59 | 875.00 | 0.057 |
| Mean  4.1 | 303.6 | 847.33 | 54.85 | 847.91 | 0.055 |
| Std. Dev.  0.21481 | 18.98812 | 24.65303 | 1.51363 | 25.13440 | 0.00251 |

The test data shows the tensile performance of the sealant, and demonstrates that the sealant has very good average tensile strength of 303.6 psi, elongation at break of 847.91%, 100% modulus of 54.85 psi, and a Shore A hardness of 22.1. The test data demonstrates that it is a low modulus, high performing elastomeric sealant which can have a high movement capability.

| SEALANT 4B TEST RESULTS (7 day, standard cure) | | | | | |
|---|---|---|---|---|---|
| Maximum Load (lbf) | Tensile Strength (psi) | Tensile strain at Maximum Load (%) | 100% Modulus (psi) | Elongation (%) | Thickness (in) |
| 1  6.7 | 331.5 | 760.00 | 77.15 | 760.00 | 0.081 |
| 2  6.8 | 338.1 | 778.33 | 73.87 | 780.00 | 0.080 |
| 3  6.7 | 330.7 | 751.67 | 76.68 | 751.67 | 0.081 |
| 4  5.7 | 295.5 | 701.67 | 74.24 | 703.33 | 0.077 |
| 5  5.8 | 326.4 | 756.67 | 75.83 | 758.33 | 0.071 |
| Mean  6.3 | 324.4 | 749.67 | 75.56 | 750.67 | 0.078 |
| Std. Dev.  0.54032 | 16.72670 | 28.65980 | 1.45190 | 28.49474 | 0.00424 |

The test data shows the tensile performance of the sealant, and demonstrates that the sealant has very good average tensile strength of 324.4 psi, elongation at break of 750.67%, 100% modulus of 75.56 psi, and a Shore A hardness of 29.4. The test data demonstrates that it is a medium performing sealant as a result of higher modulus (75.56 vs. 46.89 psi) as compared to Sealant 4A including Foralyn 90.

| SEALANT 4B TEST RESULTS (14 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 6.6 | 326.8 | 771.67 | 74.29 | 773.33 | 0.074 |
| 2 | 5.6 | 322.2 | 755.00 | 77.23 | 756.67 | 0.069 |
| 3 | 5.5 | 272.5 | 676.67 | 78.06 | 681.67 | 0.081 |
| 4 | 6.6 | 329.9 | 761.67 | 73.96 | 763.33 | 0.080 |
| 5 | 6.2 | 324.4 | 758.33 | 76.85 | 758.33 | 0.077 |
| Mean | 6.0 | 315.2 | 744.67 | 75.08 | 746.67 | 0.076 |
| Std. Dev. | 0.46005 | 24.03580 | 38.52128 | 1.83805 | 36.91204 | 0.00487 |

The test data shows the tensile performance of the sealant, and demonstrates that the sealant has very good average tensile strength of 31.2 psi, elongation at break of 746.67%, 100% modulus of 76.08 psi, and a Shore A hardness of 30.2. The test data demonstrates that it is a medium performing elastomeric sealant which has a reduced movement capability (76.08 vs. 54.85 psi) as compared to Sealant 4A including Foralyn 90.

EXAMPLE 5

Formulation of Sealants 5A and 5B

Polyurethane Sealants 5A and 5B were prepared in accordance with the formulations shown in Table 5A, based on a prepolymer prepared in accordance with Table 5B. Sealant 5A includes an ester of hydrogenated rosin (Foralyn-90) in the formulation whereas Sealant 5B lacks an ester of hydrogenated rosin in the formulation. Modulus data for Sealants 5A and 5B is provided for 7 and 14 day curing.

TABLE 5A

| | SEALANT 5A | | SEALANT 5B | |
|---|---|---|---|---|
| Component | % | Weight (g) | % | Weight (g) |
| Prepolymer | 39.50% | 1264 g | 39.50% | 1264 g |
| Calcium Oxide | 2.32% | 74.24 g | 2.32% | 74.24 g |
| Kotamite | 10.27% | 328.64 g | 10.78% | 344.96 g |
| Thixocarb 500 | 39.50% | 1264 g | 40.50% | 1296 g |
| Foralyn-90 | 1.50% | 48 g | 0 | 0 |
| TiO$_2$(R902) | 4.01% | 128.32 g | 4.00% | 128 g |
| DINCH | 1.85% | 59.2 g | 1.85% | 59.2 g |
| Incozol NC | 0.45% | 14.4 g | 0.45% | 14.4 g |
| Dabco BL-19 | 0.60% | 19.2 g | 0.60% | 19.2 g |
| Total | 100 | 3,200 | 100 | 3,200 |

Sealants 5A and 5B: The NCO:OH ratio of the prepolymer used to make Sealants 5A and 5B was 1.9:1, and had a Diol/Triol ratio of 2.5. The procedure for preparing of Sealants 5A and 5B was similar to that of Example 3.

| | SEALANT 5A | | SEALANT 5B | |
|---|---|---|---|---|
| | Upon Preparation | After 1 week in 140° F. oven | Upon Preparation | After 1 week in 140° F. oven |
| Viscosity (poise) | 5280 | 8560 | 5560 | 16780 |
| Sag (inch) | 0.25 | | 1.5 | |
| Density (lbs/gal) | 12.70 | | 12.90 | |

TABLE 5B

| Prepolymer used in Sealants 5A and 5B | | |
|---|---|---|
| Component | Percent | 2800.00 g. Batch |
| Polycin GR-35 | 57.19 | 1601.32 |
| Lupranol ® Balance 50 | 22.88 | 640.64 |
| DINCH | 5.80 | 162.4 |
| IPDI | 11.93 | 334.04 |
| Dabco 33 LV | 0.20 | 5.6 |
| PTSI | 2.00 | 56 |
| Total | 100 | 2800 |

Procedure:

The polyurethane prepolymer used in Sealants 5A and 5B was prepared following the procedure of Example 3. The theoretical NCO % was 2.163%; the NCO % measurement was 2.123%. The viscosity was measured at 136 poise at 24° C. (72° F.).

Figure 10:
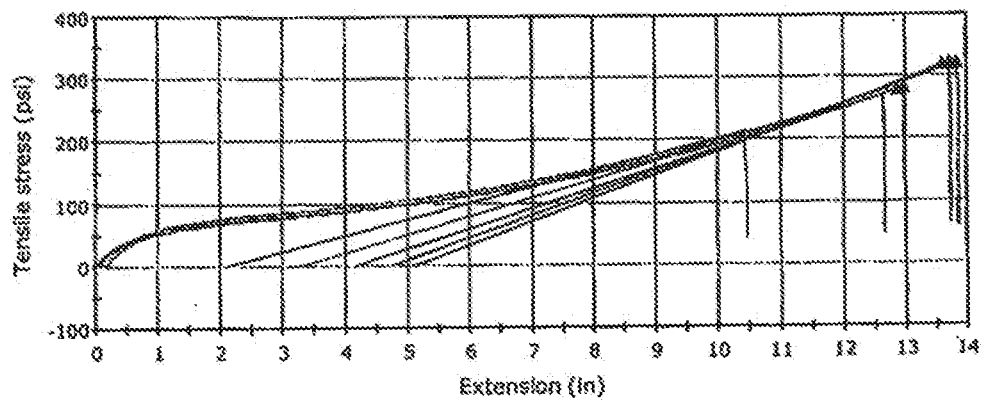
FIG. 10 is a graphical representation of the results of an ASTM D412 Tensile Test (7 day cure) for the Sealant 5A.
Figure 11:
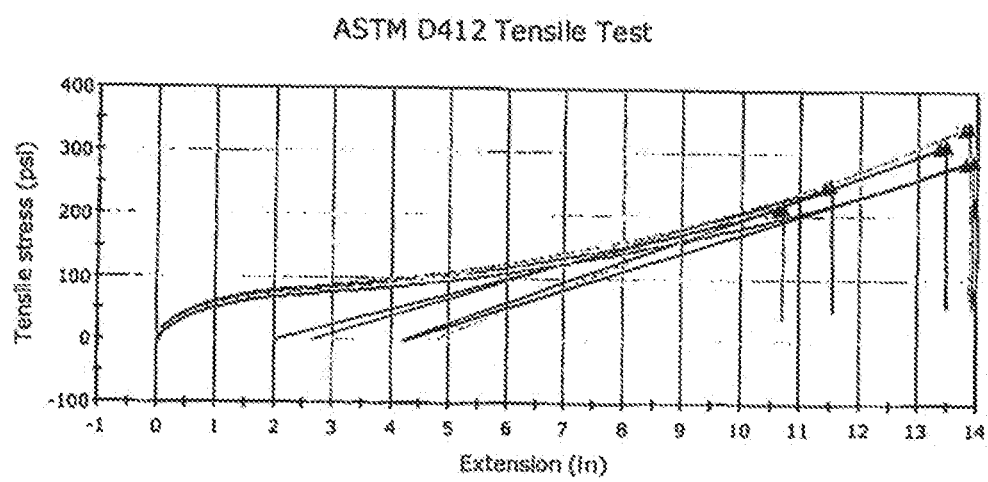
FIG. 11 is a graphical representation of the results of a second ASTM D412 Tensile Test (14 day cure) for the Sealant 5A.
Figure 12:
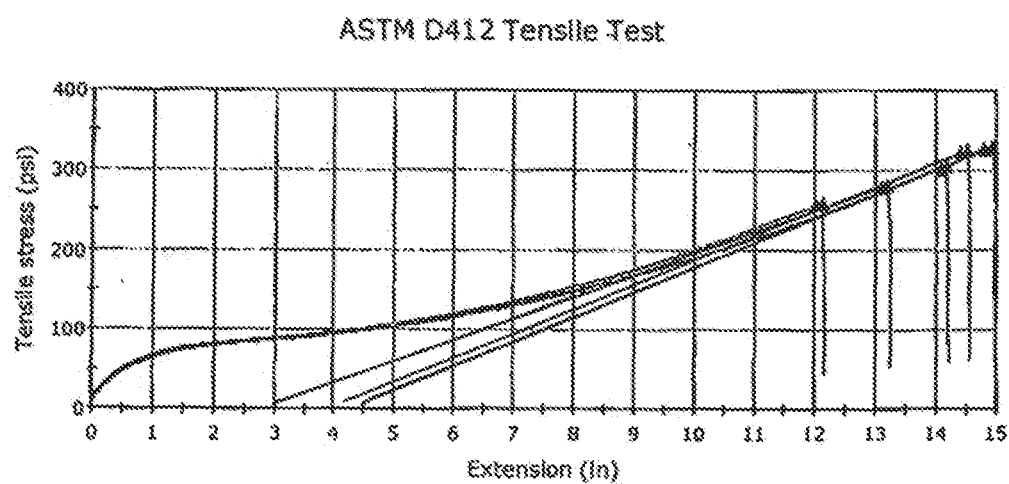
FIG. 12 is a graphical representation of the results of an ASTM D412 Tensile Test (7 day cure) for the Sealant 5B.
Figure 13:
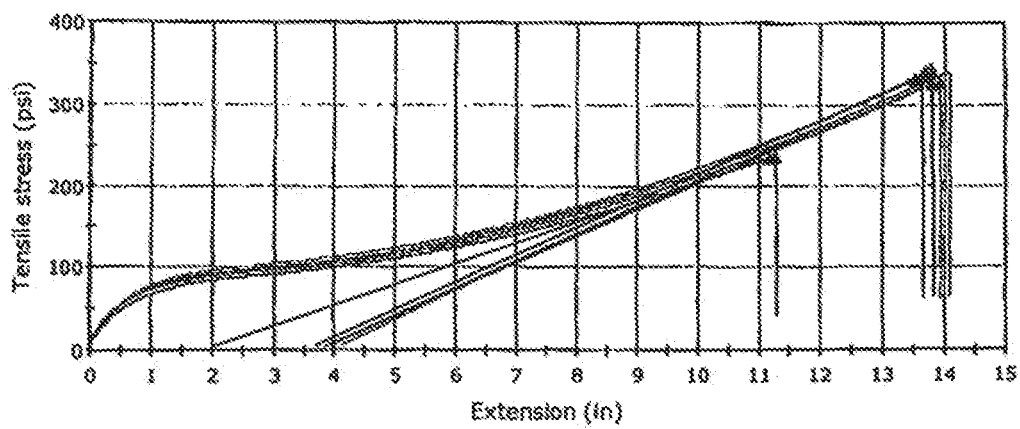
FIG. 13 is a graphical representation of the results of an ASTM D412 Tensile Test (14 day cure) for the Sealant 5B.

FIG. 10 is a graphical representation of the results of an ASTM D412 Tensile Test (7 day, standard cure) for Sealant 5A and FIG. 11 is a graphical representation of the results of an ASTM D412 Tensile Test (14 day, standard cure) for Sealant 5A. FIG. 12 is a graphical representation of the results of an ASTM D412 Tensile Test (7 day, standard cure) for Sealant 5B and FIG. 13 is a graphical representation of the results of an ASTM D412 Tensile Test (14 day, standard cure) for Sealant 5B. Test results for multiple samples, including maximum load, tensile strength, tensile strength at maximum load (%), 100% modulus (psi), elongation (%) and thickness (in), are set forth in the charts below:

| SEALANT 5A TEST RESULTS (7 day, standard cure) | | | | | | |
|---|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 2.2 | 213.0 | 521.67 | 73.90 | 523.20 | 0.041 |
| 2 | 3.1 | 282.5 | 648.33 | 69.28 | 648.33 | 0.044 |
| 3 | 3.7 | 322.6 | 691.67 | 75.46 | 691.67 | 0.046 |
| 4 | 3.0 | 268.9 | 630.00 | 71.97 | 631.67 | 0.045 |
| 5 | 3.9 | 321.6 | 685.00 | 67.48 | 886.30 | 0.049 |

-continued

SEALANT 5A TEST RESULTS (7 day, standard cure)

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| Mean | 3.2 | 281.7 | 635.33 | 71.62 | 636.23 | 0.045 |
| Std. Dev. | 0.68525 | 45.10966 | 68.47945 | 3.26661 | 68.05019 | 0.00292 |

The test data shows the tensile performance of the sealant, and demonstrates that the sealant has very good average tensile strength of 281.7 psi, elongation at break of 636.23%, 100% modulus of 71.62 psi, and a Shore A hardness of 40.1. The test data demonstrates that it is a low modulus, medium-high performing elastomeric sealant which can have a high movement capability.

SEALANT 5A TEST RESULTS (14 day, standard cure)

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 2.8 | 314.8 | 673.33 | 78.58 | 673.33 | 0.035 |
| 2 | 2.1 | 213.6 | 535.00 | 74.63 | 535.00 | 0.040 |
| 3 | 2.2 | 250.3 | 575.00 | 75.36 | 576.67 | 0.035 |
| 4 | 3.1 | 342.1 | 693.33 | 69.34 | 693.33 | 0.036 |
| 5 | 2.6 | 291.3 | 696.67 | 66.79 | 696.67 | 0.036 |
| Mean | 2.6 | 282.4 | 634.67 | 72.94 | 635.00 | 0.036 |
| Std. Dev. | 0.39726 | 51.15309 | 74.62284 | 4.77568 | 74.29270 | 0.00206 |

The test data shows the tensile performance of the sealant, and demonstrates that the sealant has very good average tensile strength of 282.4 psi, elongation at break of 635%, 100% modulus of 72.94 psi, and a Shore A hardness of 40. The test data demonstrates that it is a medium-high performing elastomeric sealant which can have a high movement capability.

SEALANT 5B TEST RESULTS (7 day, standard cure)

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 4.5 | 329.7 | 746.67 | 79.83 | 748.03 | 0.054 |
| 2 | 3.9 | 305.1 | 708.33 | 82.33 | 709.97 | 0.051 |
| 3 | 4.2 | 324.4 | 726.67 | 82.05 | 726.67 | 0.052 |
| 4 | 3.4 | 258.4 | 606.67 | 80.73 | 606.47 | 0.052 |
| 5 | 3.7 | 281.1 | 660.00 | 81.01 | 601.67 | 0.052 |
| Mean | 4.1 | 310.1 | 710.42 | 81.30 | 711.58 | 0.052 |
| Std. Dev. | 0.35127 | 21.99242 | 37.07800 | 1.13637 | 36.74429 | 0.0126 |

The test data shows the tensile performance of the sealant, and demonstrates that the sealant has very good average tensile strength of 310.1 psi, elongation at break of 711.58%, 100% modulus of 81.30 psi, and a Shore A hardness of 31.4. The test data demonstrates that it is a medium performing elastomeric sealant as the modulus is high (81.30 vs. 71.62 psi) as compared to Sealant 5A including Foralyn 90.

SEALANT 5B TEST RESULTS (14 day, standard cure)

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 3.4 | 236.1 | 563.33 | 84.09 | 563.33 | 0.057 |
| 2 | 4.5 | 339.9 | 703.33 | 92.32 | 703.33 | 0.053 |
| 3 | 4.7 | 328.0 | 695.00 | 88.38 | 696.33 | 0.057 |
| 4 | 4.4 | 343.3 | 688.33 | 96.00 | 690.00 | 0.051 |

| SEALANT 5B TEST RESULTS (14 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 5 | 4.6 | 334.6 | 681.67 | 90.95 | 681.67 | 0.055 |
| Mean | 4.3 | 316.4 | 666.33 | 90.35 | 666.97 | 0.055 |
| Std. Dev. | 0.53696 | 45.25774 | 58.13529 | 4.44902 | 58.48761 | 0.00261 |

The test data shows the tensile performance of the sealant, and demonstrates that the sealant has very good average tensile strength of 316.4 psi, elongation at break of 666.97%, 100% modulus of 90.35 psi, and a Shore A hardness of 34.0. The test data demonstrates that it is a medium performing elastomeric sealant as the modulus is high (90.35 vs 72.94 psi) as compared to Sealant 5A including Foralyn 90.

EXAMPLE 6

Formulation of Sealants 6A and 6B

Polyurethane Sealants 6A and 6B were prepared in accordance with the formulations shown in Table 6A, based on a prepolymer prepared in accordance with Table 6B. Sealant 6A includes an ester of hydrogenated rosin (Foralyn-90) in the formulation whereas Sealant 6B lacks an ester of hydrogenated rosin in the formulation. Modulus data for Sealants 6A and 6B is provided for 7 and 14 day curing.

TABLE 6A

| | SEALANT 6A | | SEALANT 6B | |
|---|---|---|---|---|
| Component | % | Weight (g) | % | Weight (g) |
| Prepolymer of Table 6B | 39.50% | 1264 g | 39.50% | 1264 g |
| Calcium Oxide | 2.32% | 74.24 g | 2.32% | 74.24 g |
| Kotamite | 10.78% | 344.96 g | 10.88% | 348.16 g |
| Thixocarb 500 | 39.50% | 1264 g | 40.25% | 1288 g |
| Foralyn-90 | 1.50% | 48 g | 0 | 0 |
| TiO$_2$(R902) | 3.50% | 112 g | 3.50% | 112 g |
| DINCH | 1.85% | 59.2 g | 2.50 g | 80 g |
| Incozol NC | 0.45% | 14.4 g | 0.45% | 14.4 g |
| Dabco BL-19 | 0.60% | 19.2 g | 0.60% | 19.2 g |
| Total | 100 | 3,200 | 100 | 3,200 |

Sealants 6A and 6B: The NCO:OH ratio of the prepolymer used to make Sealants 6A and 6B was 2.2:1, and had a Diol/Triol ratio of 1.7. The procedure for preparing of Sealants 6A and 6B was similar to that of Example 3.

| | SEALANT 6A | | | SEALANT 6B | | |
|---|---|---|---|---|---|---|
| | Upon Preparation | After 1 week, in 140° F. oven | After 3 weeks, in 140° F. oven | Upon Preparation | After 1 week in 140° F. oven | After 3 weeks, in 140° F. oven |
| Viscosity (poise) | 8340 | 13320 | 9140 | 7920 | Too high to measure | 11720 |
| Sag (inch) | 0.00 | | 0.00 | 0 | | 0 |

The viscosity was determined at standard condition. Sealants were made after 1 week, 3 weeks, and 4 weeks, respectively.

TABLE 6B

| Prepolymer used in Sealants 6A and 6B | | |
|---|---|---|
| Component | Percent | 3000 g. Batch |
| Acclaim 12200 | 52.23 | 1566.9 |
| Lupranol ® Balance 50 | 30.72 | 921.6 |
| DINCH | 5.85 | 175.5 |
| IPDI | 9.04 | 271.2 |
| Dabco BL-19 | 0.40 | 12 |
| PTSI | 1.75 | 52.5 |
| Total | 100 | 3000 |

Procedure:

In contrast to Examples 3-5 where prepolynmer was synthesized using entirely bio-based polyols, isophorone diisocyanate, amine catalyst, DINCH and PTSI, in Example 6 prepolymer was synthesized using Acclaim 12200 instead of bio-based polyols, although still containing Balance 50 which contains castor oil. Acclaim 12200 is a polyether polyol, available from Bayer Material Science, that is a 11,200 molecular-weight diol based on propylene oxide.

The polyurethane prepolymer was prepared following the procedure of Example 3. The above reactants, except PTSI, were heated to a temperature of 158° F. (70° C.) and mixed at 450 RPM in a 3 L flask. The reactants were allowed to exotherm to 165-170° F. and to mix for several hours. The reaction was then paused and resumed the next day, when the reactants were allowed to exotherm. The theoretical NCO % was 1.8586%; a first NCO % measurement of 1.941% was taken on day 2, and a second NCO % measurement of 1.831% was taken on day 3. When the temperature was between 120-125° F. (on day 3), the required amount of PTSI drying agent was added, and the mixture was mixed for about 30 minutes. The batch was then emptied. Due to the slow reactivity of the polyol and IPDI, 3 days were allowed for the NCO % approach the theoretical value.

Figure 14:
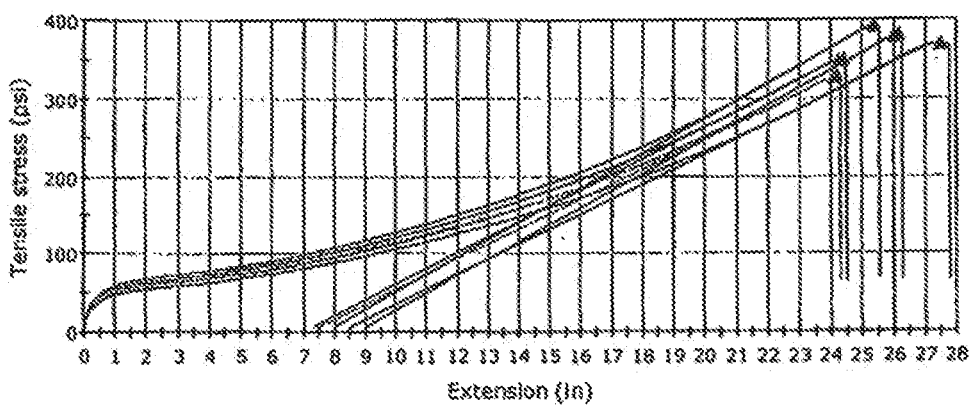
FIG. 14 is a graphical representation of the results of an ASTM D412 Tensile Test (7 day cure) for the Sealant 6A.
Figure 15:
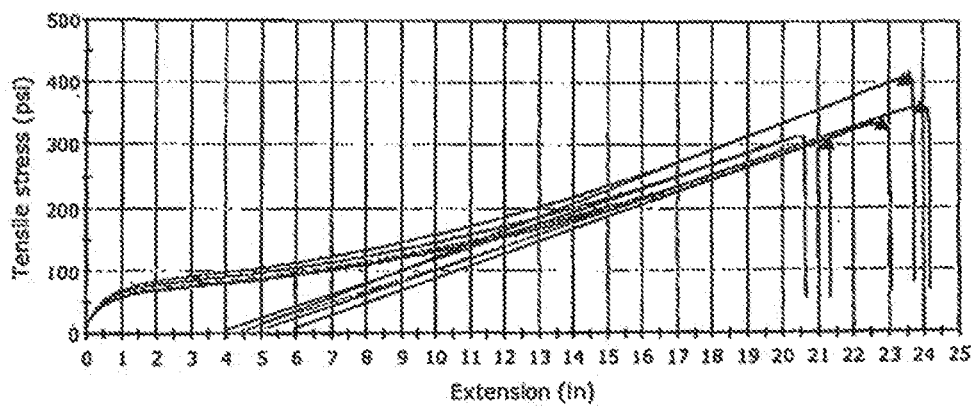
FIG. 15 is a graphical representation of the results of a second ASTM D412 Tensile Test (14 day cure) for the Sealant 6A.
Figure 16:
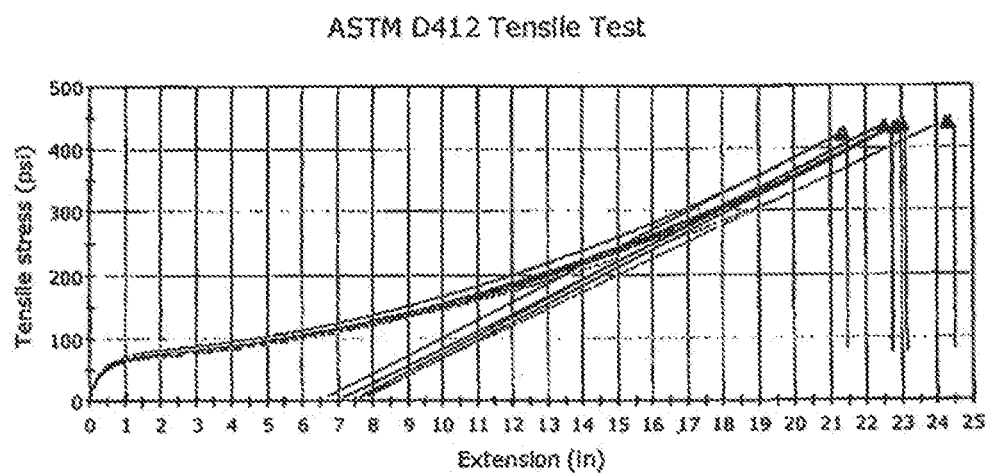
FIG. 16 is a graphical representation of the results of an ASTM D412 Tensile Test (7 day cure) for the Sealant 6B.
Figure 17:
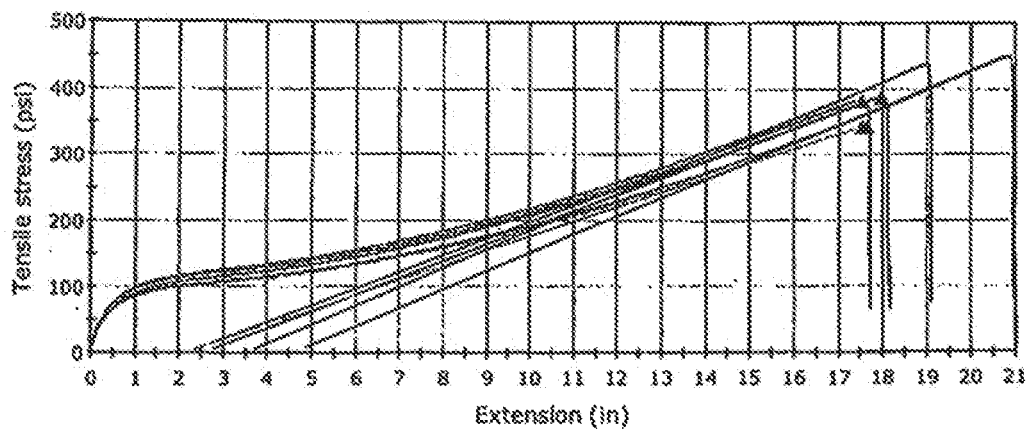
FIG. 17 is a graphical representation of the results of an ASTM D412 Tensile Test (14 day cure) for the Sealant 6B.

FIG. 14 is a graphical representation of the results of an ASTM D412 Tensile Test (7 day, standard cure) for Sealant 6A and FIG. 15 is a graphical representation of the results of an ASTM D412 Tensile Test (14 day, standard cure) for Sealant 6A. FIG. 16 is a graphical representation of the results of an ASTM D412 Tensile Test (7 day, standard cure) for Sealant 6B and FIG. 17 is a graphical representation of the results of an ASTM D412 Tensile Test (14 day, standard cure) for Sealant 6B. Test results for multiple samples, including maximum load, tensile strength, tensile strength at maximum load (%), 100% modulus (psi), elongation (%) and thickness (in), are set forth in the charts below:

| | SEALANT 6A TEST RESULTS (7 day, standard cure) | | | | | |
|---|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 7.9 | 369.5 | 1373.33 | 53.97 | 1390.00 | 0.086 |
| 2 | 5.2 | 348.9 | 1220.00 | 62.88 | 1224.97 | 0.060 |
| 3 | 7.1 | 381.3 | 1310.00 | 58.68 | 1313.33 | 0.075 |
| 4 | 5.7 | 327.9 | 1210.00 | 60.68 | 1215.00 | 0.070 |
| 5 | 5.9 | 391.5 | 1270.00 | 67.02 | 1278.33 | 0.060 |
| Mean | 6.4 | 363.8 | 1276.67 | 60.65 | 1284.33 | 0.070 |
| Std. Dev. | 1.12021 | 25.53897 | 67.37120 | 4.84798 | 71.36863 | 0.01096 |

The test data shows the tensile performance of the partially bio-based sealant, and demonstrates that the sealant has average tensile strength of 363.8 psi, elongation at break of 1284.33%, 100% modulus of 60.65 psi, and a Shore A hardness of 37.4. The test data demonstrates that it is a high performing elastomeric sealant which can have a high movement capability.

| | SEALANT 6A TEST RESULTS (14 day, standard cure) | | | | | |
|---|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 6.2 | 407.4 | 1178.33 | 83.17 | 1183.33 | 0.061 |
| 2 | 5.4 | 315.3 | 1030.00 | 77.67 | 1031.60 | 0.069 |
| 3 | 7.0 | 360.6 | 1195.00 | 72.63 | 1206.67 | 0.078 |
| 4 | 6.1 | 304.5 | 1065.00 | 71.75 | 1066.67 | 0.080 |
| 5 | 7.1 | 335.0 | 1138.33 | 68.69 | 1150.00 | 0.085 |
| Mean | 6.4 | 344.6 | 1121.33 | 74.78 | 1127.65 | 0.075 |
| Std. Dev. | 0.70109 | 41.08086 | 71.55419 | 5.69453 | 75.47900 | 0.00956 |

The test data shows the tensile performance of the sealant, and demonstrates that the sealant has very good average tensile strength of 344.6 psi, elongation at break of 1127.65, 100% modulus of 74.78 psi, and a Shore A hardness of 25.6. The test data demonstrates that it is a high performing elastomeric sealant which can have a high movement capability.

| | SEALANT 6B TEST RESULTS (7 day, standard cure) | | | | | |
|---|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 7.4 | 434.1 | 1126.67 | 75.04 | 1135.00 | 0.068 |
| 2 | 8.6 | 436.6 | 1151.67 | 71.77 | 1155.00 | 0.079 |
| 3 | 5.8 | 424.3 | 1068.33 | 81.43 | 1073.33 | 0.055 |
| 4 | 9.3 | 439.6 | 1216.67 | 71.03 | 1224.63 | 0.085 |
| 5 | 7.7 | 431.7 | 1141.67 | 15.59 | 1148.33 | 0.071 |
| Mean | 7.8 | 433.3 | 1141.00 | 74.97 | 1141.26 | 0.072 |
| Std. Dev. | 1.33353 | 5.83028 | 53.21077 | 4.11885 | 53.99797 | 0.01144 |

The test data shows the tensile performance of the sealant, and demonstrates that the sealant has very good average tensile strength of 433.3 psi, elongation at break of 1147.26%, 100% modulus of 74.97 psi, and a Shore A hardness of 36.5. The test data demonstrates that it is a medium performing elastomeric sealant which has a lower movement capability than entirely bio-based sealant formulations including Foralyn 90 as a modulus reducing additive.

| SEALANT 6B TEST RESULTS (14 day, standard cure) | | | | | |
|---|---|---|---|---|---|
| | Maximum Load (lbf) | Tensile Strength (psi) | Tensile strain at Maximum Load (%) | 100% Modulus (psi) | Elongation (%) | Thickness (in) |
| 1 | 5.3 | 437.7 | 948.33 | 116.28 | 953.33 | 0.048 |
| 2 | 5.4 | 388.1 | 898.33 | 106.45 | 906.27 | 0.056 |
| 3 | 5.6 | 382.8 | 876.67 | 113.27 | 885.00 | 0.058 |
| 4 | 6.4 | 343.8 | 881.67 | 98.18 | 884.77 | 0.074 |
| 5 | 8.4 | 449.0 | 1043.33 | 100.21 | 1047.87 | 0.075 |
| Mean | 6.2 | 400.3 | 929.67 | 106.88 | 935.45 | 0.062 |
| Std. Dev. | 1.30919 | 43.07312 | 69.57612 | 7.89924 | 68.78038 | 0.01184 |

The test data shows the tensile performance of the partially-bio-based sealant, and demonstrates that the sealant has very good average tensile strength of 400.3 psi, elongation at break of 935.45%, 100% modulus of 106.88 psi, and a shore A hardness of 37.8. The test data demonstrates that it is a medium performing elastomeric sealant which has a lower movement capability than entirely bio-based sealant formulations including Foralyn 90 as a modulus reducing additive.

EXAMPLE 7

General Formulation of the Adhesive

Table 7 below indicates ranges of components of a representative formulation for synthesizing the adhesive.

TABLE 7

| Component | Percentage Range |
|---|---|
| Prepolymer | 30-40% |
| Calcium Oxide (drying agent) | 1-3% |
| Mistron Vapor RE (Talc) | 5-30% |
| Drikalite (ground calcium carbonate) | 10-25% |
| Foralyn 90, Hydrogenated Rosin | 0.5-2% |
| LA-7 (recycled glass filler) | 10-20% |
| DINCH (plasticizer) | 5-15% |
| Expancel | 0-0.5% |
| Incazol NC (moisture scavenger) | 0.2-0.6% |
| Dabco BL-19 (catalyst) | 0.3-1% |
| Bicat 3228 (catalyst) | 0.3-1% |

MISTRON VAPOR is powdered talc containing about 0.5% of free water marketed by Cypress Minerals.

Procedure:

The prepolymer was added to the Ross mixer followed by the Calcium Oxide and mixed well for 10 minutes at 600 rpm. Drikalite, Mistron Vapor RE, Dry LA-7, F90 and DINCH were added. The batch was mixed for 10 minutes at 600 rpm. The batch was then bested to 175° F. Expancel was added and the batch mixed for 10 minutes. Incozol NC and the catalysts were added. The batch was mixed for 5 minutes at 600 rpm before applying vacuum. Mixing was continued for 10 minutes under vacuum. The batch was then emptied.

Viscosity of the adhesive was between 1000-3000 poise at 24° C. The skin time is between 60-90 minutes. Skin time is the time required for forming a surface skin i.e., starting of cure.

EXAMPLE 8

Preparation of Adhesive

A polyurethane Adhesive was prepared in accordance with the formulations shown in Table 8A, based on a prepolymer prepared in accordance with Table 8B. The Adhesive includes an ester of hydrogenated rosin (Foralyn-90) in the formulation.

TABLE 8A

| Component | Percentage (%) | Weight (g.) |
|---|---|---|
| Prepolymer of Table 8B | 30.00 | 960 |
| Calcium Oxide | 1.95 | 62.4 |
| Dry LA-7 | 20.34 | 650.88 |
| Mistron Vapor RE | 13.30 | 425.6 |
| Drikalite | 20.56 | 657.92 |
| Foralyn 90 | 1.50 | 48 |
| DINCH | 11.25 | 360 |
| Expancel | 0.35 | 11.2 |
| Incozol NC | 0.25 | 8 |
| Bicat 3228 catalyst | 0.50 | 16 |
| Total | 100 | 3200 |

Procedure:

The prepolymer and Calcium Oxide were added to the Ross mixer and mixed well for minutes at 600 rpm. Drikalite, Mistron Vapor RE, Dry LA-7, F90 and DINCH were added. The batch was mixed for 10 minutes at 600 rpm. The batch was then heated to 175° F., the blade increased to 900 rpm, and the batch mixed for 46 minutes under vacuum. The blade was reduced to 500 rpm. The batch was cooled to 90° F., Expancel was added and the batch mixed for 10 minutes. Incozol NC and the catalyst were added. The batch was mixed for 5 minutes before applying vacuum. Mixing was continued for 10 minutes under vacuum. The batch was then emptied.

Viscosity: 1920 poise at 24° C.
Density: 11.59 lbs/gal
Skin time: 90 minutes
Shore A: 36.8

TABLE 8B

| Prepolymer used in Adhesive of Example 8 | | | |
|---|---|---|---|
| Component | Weight (g) | Percent | 2800.00 g. Batch |
| Polycin GR-35 | 60.03 | 60.03 | 1680.84 |
| Lupranol ® Balance 50 | 20.7 | 20.70 | 579.60 |
| DINCH | 5.8 | 5.8 | 162.4 |
| IPDI | 11.27 | 11.27 | 315.56 |
| Dabco 33LV | 0.2 | 0.2 | 5.6 |
| PTSI | 2 | 2 | 56 |
| Total | 99.95 | 100 | 2800 |

The polyurethane prepolymer used in the Adhesive of Example 8 was prepared following the procedure of Example 3. The theoretical NCO % was 1.91657%; the NCO % measurement was 1.842. The 315.56 g. IPDI needed for reacting with polyols at an NCO:OH ratio of 1.9:1 was added. The viscosity was measured at 250 poise at 24° C. (72° F.).

Figure 18:
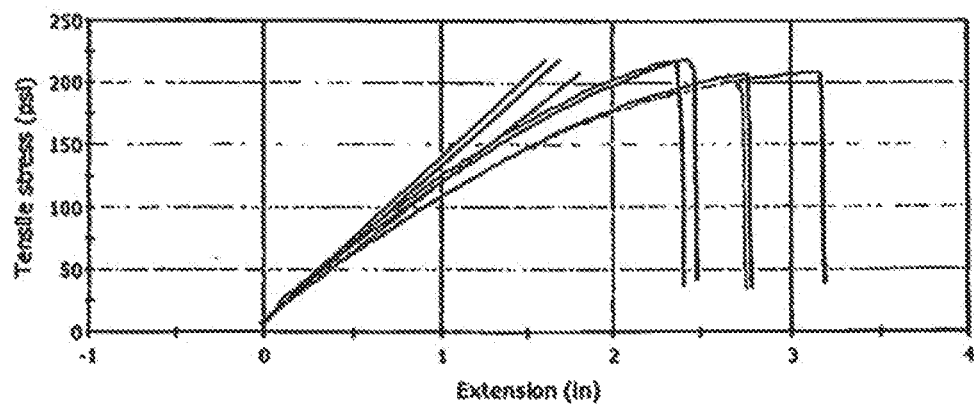
FIG. 18 is a graphical representation of the results of an ASTM D412 Tensile Test (7 day cure) for the Adhesive of Example 8.

FIG. 18 is a graphical representation of the results of a Rubber-Tensile Test (Method A) for the adhesive of Example 8 as measured by ASTM D412 Tensile Test. Test results for multiple samples, including maximum load, tensile strength, tensile strength at maximum load, 100% modulus (psi), elongation (%) and thickness, are set forth below:

ADHESIVE OF EX. 8 RUBBER-TENSILE TEST RESULTS

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 2.3 | 207.0 | 136.67 | 178.52 | 138.33 | 0.045 |
| 2 | 2.2 | 208.1 | 156.67 | 176.25 | 158.33 | 0.043 |
| 3 | 2.3 | 218.1 | 118.33 | 202.65 | 119.93 | 0.042 |
| X4 | 2.2 | 200.5 | 133.33 | 176.14 | 136.67 | 0.043 |
| X5 | 2.4 | 218.9 | 121.67 | 198.24 | 123.33 | 0.043 |
| Mean | 2.3 | 210.5 | 133.33 | 186.36 | 135.32 | 0.043 |
| Std. Dev. | 0.07905 | 7.84427 | 15.13837 | 12.98663 | 15.17358 | 0.00110 |

The test data shows the tensile performance of the adhesive. Tensile strength of the adhesive indicates how much stress the adhesive can withstand before it undergoes breaking under stretching conditions. This formulation had an average tensile strength of 210.5 psi which is very good for an adhesive. The five samples tested were from same batch and from the same sheet.

Figure 19:
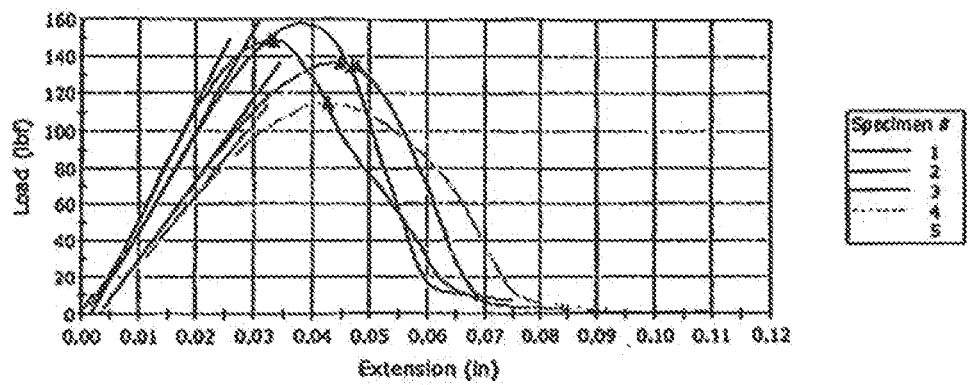
FIG. 19 is a graphical representation of the results of an ASTM D1002 Adhesive Lap Joint Test for the Adhesive of Example 8 (wood on wood, 7 days).

FIG. 19 is a graphical representation of the results of an Adhesive-Shear by Tension (Metal-Metal) Test for the Adhesive of Example 8 as measured by ASTM D1002 Adhesive Lap Joint Test. Test results, including maximum load, tensile strength, tensile stress at maximum load, loss, width, and length of overlap, are set forth below:

ADHESIVE OF EX. 8
ADHESIVE-SHEAR BY TENSION (METAL-METAL) TEST RESULTS

|   | Maximum Load (lbf) | Tensile stress at Maximum Load (psi) | Loss (% coh) | Width (in) | Length of Overlap (in) |
|---|---|---|---|---|---|
| 1 | 136.59 | 135.32 | 100 | 0.980 | 1.030 |
| 2 | 158.26 | 159.86 | 100 | 1.000 | 0.990 |
| 3 | 148.85 | 141.76 | 100 | 1.000 | 1.050 |
| 4 | 114.39 | 119.15 | 100 | 0.960 | 1.000 |
| 5 | 134.97 | 128.54 | 100 | 1.000 | 1.050 |
| Mean | 138.61 | 136.93 |  | 0.988 | 1.024 |
| Std. Dev. | 16.54651 | 15.31487 |  | 0.01789 | 0.02793 |

The test conditions were wood on wood, 7 days, i.e., the adhesive was applied between two wood substrates, cured and tested. The five samples tested were from the same batch. The average adhesive strength of the adhesive when tested between two wood pieces was 136.9 psi with 100% cohesive failures, no adhesive failures.

Figure 20:
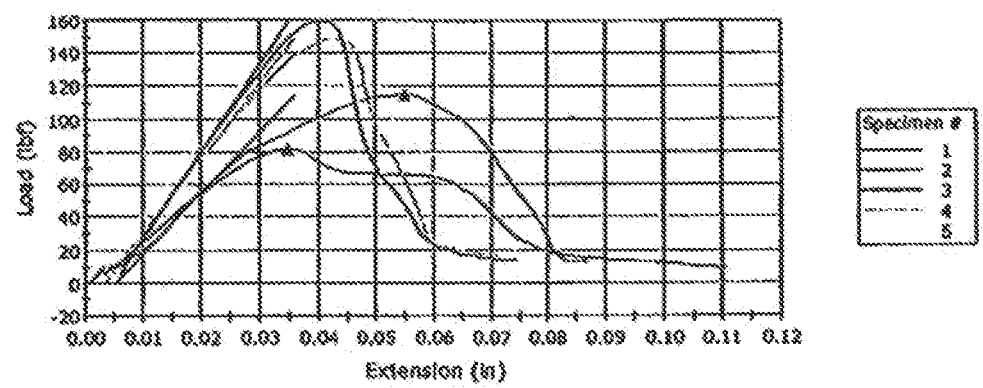
FIG. 20 is a graphical representation of the results of an ASTM D1002 Adhesive Lap Joint Test for the Adhesive of Example 8 (wood on concrete, 7 days).

FIG. 20 is a graphical representation of the results of an Adhesive—Shear by Tension (Metal-Metal) Test for the Adhesive of Example 8 as measured by ASTM D1002 Adhesive Lap Joint Test. Test results, including maximum load, tensile strength, tensile stress at maximum load, loss, width, and length of overlap, are set forth below:

ADHESIVE OF EX. 8
ADHESIVE-SHEAR BY TENSION (METAL-METAL) TEST RESULTS

|   | Maximum Load (lbf) | Tensile stress at Maximum Load (psi) | Loss (% coh) | Width (in) | Length of Overlap (in) |
|---|---|---|---|---|---|
| 1 | 81.68 | 82.52 | 100 | 1.010 | 0.980 |
| 2 | 159.88 | 158.30 | 100 | 1.010 | 1.000 |
| 3 | 115.19 | 112.93 | 100 | 1.020 | 1.000 |
| 4 | 148.95 | 148.96 | 100 | 1.010 | 0.990 |
| 5 | 115.19 | 116.35 | 100 | 1.000 | 0.990 |
| Mean | 124.18 | 123.81 |  | 1.010 | 0.992 |
| Std. Dev. | 31.04693 | 30.41587 |  | 0.00707 | 0.00837 |

The test conditions were wood on concrete, 7 days, i.e., the adhesive was applied between wood/concrete substrates, cured and tested. The five samples tested are from the same batch. The average adhesive strength of the adhesive when tested between wood and concrete pieces was 123.8 psi with 100% cohesive failures, no adhesive failures.

EXAMPLE 9

Preparation of Adhesives 9A and 9B

Polyurethane Adhesives 9A and 9B were prepared in accordance with the formulations shown in Table 9, based on a prepolymer prepared in accordance with Table 9. Adhesive 9A includes an ester of hydrogenated rosin (Foralyn-90) in the formulation whereas Adhesive 9B lacks an ester of hydrogenated rosin in the formulation.

TABLE 9A

|  | ADHESIVE 9A | | ADHESIVE 9B | |
|---|---|---|---|---|
| Component | Percentage (%) | Weight (g.) | Percentage (%) | Weight (g.) |
| Prepolymer of Table 9B | 30.00 | 960 | 30.00 | 960 |
| Calcium Oxide | 1.95 | 62.4 | 1.95 | 62.4 |
| LA-300 | 20.24 | 647.68 | 20.14 | 644.48 |
| Mistron Vapor RE | 13.51 | 432.32 | 16.00 | 512 |
| Drikalite | 17.25 | 552 | 20.11 | 643.52 |
| F90 | 4.00 | 128 | 0 | 0 |
| DINCH | 11.25 | 360 | 20.11 | 643.52 |
| Expancel | 0.35 | 11.2 | 0 | 0 |
| Incozol NC | 0.25 | 8 | 0.25 | 8 |
| BL-19 | 0.65 | 20.8 | 0.65 | 20.8 |
| Bicat 3228 catalyst | 0.55 | 17.6 | 0.65 | 20.8 |
| Total | 100 | 3200 | 100 | 3200 |

Procedure:

The prepolymer and Calcium Oxide were added to the Ross mixer and mixed well for 10 minutes at 600 RPM. Drikalite, Mistron Vapor, LA-300, F90 (for Adhesive 9A) and DINCH were added. The batch was mixed for 10 minutes at 600 RPM. The batch was then heated to 185° F., the blade increased to 900 RPM, and the batch mixed for 90 minutes under vacuum. The blade was reduced to 500 RPM. The batch was cooled to 90° F., Expancel was added to the adhesive 9A and the batch mixed for 10 minutes. Incozol NC and the catalyst were added. The batch was mixed for 5 minutes before applying vacuum. Mixing was continued for 10 minutes under vacuum. The batch was then emptied.

|  | Adhesive 9A | Adhesive 9B |
| --- | --- | --- |
| Viscosity (poise at 24° C.) | 1760 | 1860 |
| Density (lbs/gal.) | 12.89 | 11.40 |

TABLE 9B

Prepolymer used in Adhesives 9A and 9B

| Component | Weight (g) | Percent | Moisture (%) | 3200 g. Batch |
| --- | --- | --- | --- | --- |
| Polycin GR-35 | 60.23 | 60.23 | 0.009 | 1927.36 |
| Lupranol ® Balance 50 | 20.77 | 20.77 | 0.053 | 664.64 |
| DINCH | 5.8 | 5.8 |  | 185.6 |
| IPDI | 11.3 | 11.3 |  | 361.6 |
| Dabco 33LV | 0.1 | 0.1 |  | 3.2 |
| PTSI | 1.8 | 1.8 |  | 57.6 |
| Total | 100 | 100 |  | 3200 |

Procedure for Preparing the Prepolymer Used in Adhesive 9A:

The polyurethane prepolymer was prepared following the procedure of Example 3. The theoretical NCO % was 1.9191%; the two NCO % measurements were 2.08 and 2.079. The extra amount of IPDI (4.32 g) was added to the 361.60 g. IPDI needed for reacting with polyols at an NCO:OH ratio of 1.9:1, for a total amount of isocyanate of 370.72. The viscosity was in the range of about 110-130 poise at 72° F.

Procedure for Preparing the Prepolymer Used in Adhesive 9B:

The polyurethane prepolymer was prepared following the procedure of Example 3. The theoretical NCO % was 1.9191%; the NCO % measurement was 2.03. The extra amount of IPDI (4.32 g) was added to the 361.60 g. IPDI needed for reacting with polyols at an NCO:OH ratio of 1.9:1, for a total amount of isocyanate of 370.72. The viscosity was in the range of about 110-130 poise at 72° F.

Figure 21:
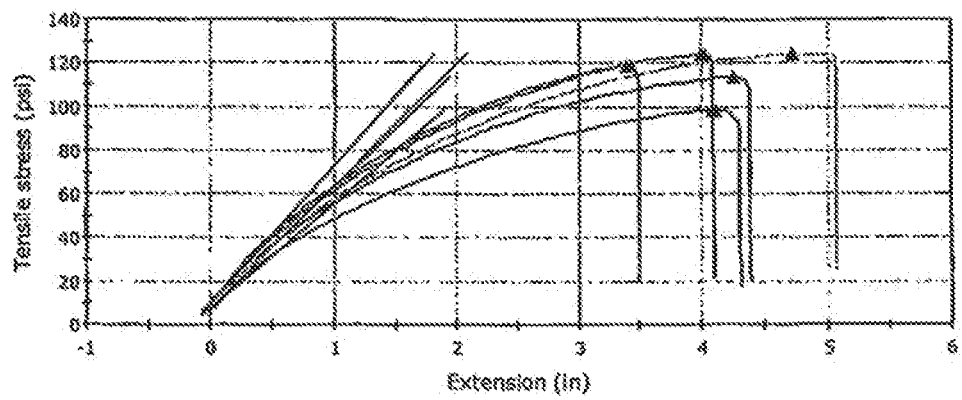
FIG. 21 is a graphical representation of the results of an ASTM D412 Tensile Test (7 day cure) for the Adhesive 9A.
Figure 22:
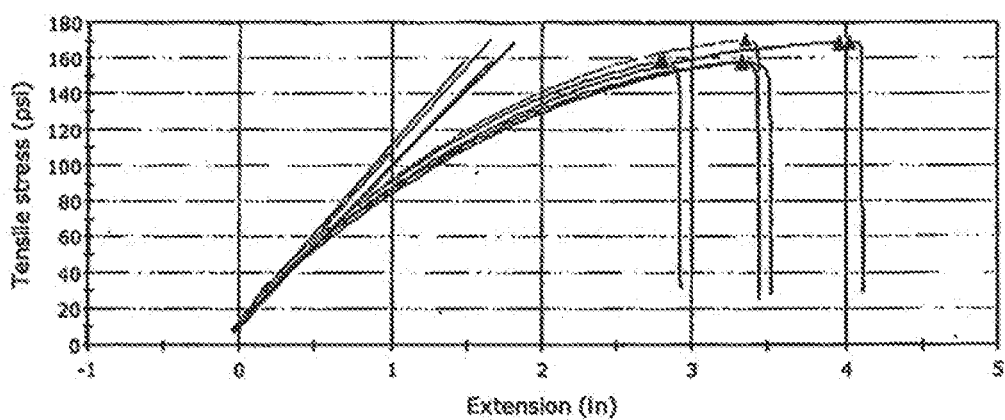
FIG. 22 is a graphical representation of the results of an ASTM D412 Tensile Test (7 day cure) for the Adhesive 9B.

FIG. 21 is a graphical representation of the results of a Rubber-Tensile Test (Method A) for Adhesive 9A as measured by ASTM D412 Tensile Test. FIG. 22 is a graphical representation of the results of a Rubber-Tensile Test (Method A) for Adhesive 9B as measured by ASTM D412 Tensile Test.

Test results for multiple samples, including maximum load, tensile strength, tensile strength at maximum load, 100% modulus (psi), elongation (%) and thickness, are set forth below:

ADHESIVE 9A TEST RESULTS

|  | Maximum Load (lbf) | Tensile Strength (psi) | Tensile strain at Maximum Load (%) | 100% Modulus (psi) | Elongation (%) | Thickness (in) |
| --- | --- | --- | --- | --- | --- | --- |
| 1 | 1.0 | 113.4 | 213.03 | 83.80 | 218.03 | 0.034 |
| 2 | 1.0 | 124.1 | 199.63 | 94.82 | 204.23 | 0.033 |
| 3 | 1.1 | 118.7 | 169.33 | 93.33 | 173.97 | 0.036 |
| 4 | 1.2 | 124.2 | 235.93 | 87.68 | 252.60 | 0.040 |
| 5 | 1.2 | 98.5 | 204.60 | 72.51 | 214.53 | 0.047 |
| Mean | 1.1 | 115.8 | 204.55 | 86.43 | 212.67 | 0.038 |
| Std. Dev. | 0.11021 | 10.64081 | 24.01676 | 8.94808 | 28.26564 | 0.00570 |

The test data shows the tensile performance of Adhesive 9A. Tensile strength of the adhesive indicates how much stress the adhesive can withstand before it undergoes breaking under stretching conditions. This formulation had an average tensile strength of 115.8 psi and 100% modulus of 86.43 psi which is very good for an adhesive and a Shore A hardness of 21.0. The five samples tested were from same batch and from the same sheet.

ADHESIVE 9B TEST RESULTS

|  | Maximum Load (lbf) | Tensile Strength (psi) | Tensile strain at Maximum Load (%) | 100% Modulus (psi) | Elongation (%) | Thickness (in) |
| --- | --- | --- | --- | --- | --- | --- |
| 1 | 1.9 | 158.2 | 166.17 | 129.52 | 174.90 | 0.048 |
| 2 | 2.0 | 168.6 | 198.00 | 134.19 | 204.67 | 0.048 |
| 3 | 1.8 | 158.0 | 139.40 | 138.07 | 145.07 | 0.046 |
| 4 | 1.8 | 170.6 | 167.33 | 141.23 | 171.20 | 0.043 |
| 5 | 1.6 | 157.8 | 166.53 | 131.69 | 171.00 | 0.041 |
| Mean | 1.8 | 162.7 | 167.49 | 134.94 | 173.37 | 0.045 |
| Std. Dev. | 0.14786 | 6.39931 | 20.75208 | 4.74240 | 21.17337 | 0.00311 |

The test data shows the tensile performance of the adhesive. Tensile strength of the adhesive indicates how much stress the adhesive can withstand before it undergoes breaking under stretching conditions. This formulation had an average tensile strength of 162.7 psi and 100% modulus of 134.94 and a Shore A hardness of 30.1. The five samples tested were from same cast sheet made from the same batch.

The results shown in the above Tables and the attached Figures demonstrate the use of Foralyn™ 90 ester of hydrogenated rosin in sealant formulations reduced the modulus of the final sealant, which is desired for a high performing joint sealant. The modulus reducing effect was also seen in adhesive formulations including Foralyn™ 90 ester of hydrogenated rosin, but at higher levels of Foralyn™ 90 ester than are present in the sealant formulations. The adhesive formulations have lower prepolymer levels than the sealant formulations, and include high particle size fillers (i.e., Drikalite). Thus, using hydrogenated rosin esters at a higher level, a reduction in modulus can be obtained in the adhesive formulation, even with lower prepolymer level and using high particle size fillers. Example 8 demonstrates that addition of a hydrogenated rosin ester reduces the modulus of adhesive formulations including a filler such as Drikalite (calcium carbonate).

Adhesive formulations typically include fillers to produce desirable flow characteristics. The presence of high proportions of fillers (such as calcium carbonate) in adhesive formulations tends to lead to cured compositions with a modulus at 100% elongation which is higher than desired for many adhesive applications. Higher proportions of filler, particularly of higher particle size, raises the modulus. Unexpectedly, it has been found that addition of rosin esters reduces the modulus of adhesive formulations including fillers with higher particle size.

The invention claimed is:

1. A low modulus sealant or adhesive composition comprising:
   (i) a polyurethane prepolymer comprising an isocyanate and a polyol having a bio-based content of from about 15% to about 75% by weight; and
   (ii) a modulus reducing additive comprising at least one of rosin esters, hydrogenated rosin esters, or mixtures thereof.

2. The composition of claim 1, wherein said polyurethane prepolymer comprises
   (a) a polyol entirely derived from a natural oil; and
   (b) a natural oil-petroleum blend polyol.

3. The composition of claim 1, wherein said polyurethane prepolymer further comprises at least one of (a) catalyst; (b) drying agent, or (c) plasticizer.

4. The composition of claim 1, wherein said modulus reducing additive comprises at least one of glycerol ester of hydrogenated rosin, pentaerythritol ester of hydrogenated rosin, or mixtures thereof.

5. The composition of claim 1, wherein the modulus reducing additive is present in the composition in an amount sufficient to provide a 100% modulus of less than or equal to 85 psi, optionally from about 40 to about 85 psi, for a sealant composition, or less than or equal to 100 psi, optionally from about 86 to about 100 psi, for an adhesive composition.

6. The composition of claim 1, wherein the modulus reducing additive is present in an amount from about 0.5 wt. % to about 2 wt. % in the sealant composition, or in an amount from about 1 wt. % to about 5 wt. % in the adhesive composition.

7. A one component, moisture curable polyurethane sealant composition according to claim 1, wherein the sealant exhibits at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C., or a sag of from about 0 to 0.18 inch.

8. A moisture-curable polyurethane adhesive composition according to claim 1, wherein the adhesive exhibits at least one of a bio-based content of from about 10% to about 20% by weight, an adhesive strength from about 100 to about 175 psi, or a viscosity of from about 1200 poise to about 2000 poise at 24° C.

9. The composition of claim 8, wherein the polyol entirely derived from a natural oil is a 100% castor oil based polyol having at least one of an average molecular weight (Mn) of about 3400 grams/mole to about 4000 grams/mole, a functionality of 2, and a hydroxyl number from 33 to 40.

10. The composition of claim 8, wherein the natural oil-petroleum blend polyol comprises a castor oil-petroleum blend polyol having a functionality of from 2 to about 2.75.

11. The composition of claim 8, wherein the isocyanate comprises at least one of toluene diisocyanate (TDI), methylene diphenyl diisocyanate (MDI), phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanate, ethylene diisocyanate, propylene diisocyanate, tetramethylene diisocyanate, hexamethylene diisocyanate, isophorone diisocyanate (IPDI), dimers or trimers thereof, or mixtures thereof.

12. The composition of claim 8, wherein the isocyanate comprises at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, urethodione diisocyanate, isocyanurate trisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate, 1-isocyanatomethyl-3-isocyanato-1,5,5-trimethyl diisocyanate, dimers or trimers thereof, or mixtures thereof.

13. The composition of claim 8, further comprising at least one additive comprising organic filler, inorganic filler, plasticizer, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, catalyst, defoaming agent, storage stabilizer, latent hardener, drying agent, cure retarder, or mixtures thereof.

14. The composition of claim 7, wherein the polyol entirely derived from a natural oil is a 100% castor oil based polyol having at least one of an average molecular weight (Mn) of about 3400 grams/mole to about 4000 grams/mole, a functionality of 2, and a hydroxyl number from 33 to 40.

15. The composition of claim 7, wherein the natural oil-petroleum blend polyol comprises a castor oil-petroleum blend polyol having a functionality of from 2 to about 2.75.

16. The composition of claim 7, wherein the isocyanate comprises at least one of toluene diisocyanate (TDI), methylene diphenyl diisocyanate (MDI), phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanate, ethylene diisocyanate, propylene diisocyanate, tetramethylene diisocyanate, hexamethylene diisocyanate, isophorone diisocyanate (IPDI), dimers or trimers thereof, or mixtures thereof.

17. The composition of claim 7, wherein the isocyanate comprises at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, urethodione diisocyanate, isocyanurate trisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate, 1-isocyanatomethyl-3-isocyanato-1,5,5-trimethyl diisocyanate, dimers or trimers thereof, or mixtures thereof.

18. The composition of claim 7, further comprising at least one additive comprising organic filler, inorganic filler, plasticizer, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, catalyst, defoaming agent, storage stabilizer, latent hardener, drying agent, cure retarder, or mixtures thereof.

19. A method for making a low modulus, moisture-curable polyurethane sealant or adhesive capable of curing to form a reaction product, the method comprising:
providing a polyurethane prepolymer comprising an isocyanate and a polyol having a bio-based content of from about 15% to about 75% by weight; and
admixing with the polyurethane prepolymer (i) a modulus reducing additive comprising at least one of rosin esters, hydrogenated rosin esters, or mixtures thereof, (ii) at least one of (a) catalyst; (b) drying agent, or (c) plasticizer, and (iii) optionally at least one additive comprising organic filler, inorganic filler, chain extender, antioxidant, UV stabilizer, light stabilizer, fungicide, mildewcide, biocide, fire retardant, surface additive, coloring agent, solvent, mineral oil, thixotropic agent, dispersing agent, adhesion promoter, defoaming agens, storage stabilizer, latent hardener, cure retarder, or mixtures thereof, for a sufficient time to produce a polyurethane sealant or adhesive.

20. The method of claim 19, wherein the rosin ester comprises at least one of glycerol ester of hydrogenated rosin, pentaerythritol ester of hydrogenated rosin, or mixtures thereof.

21. The method of claim 19, wherein said polyurethane prepolymer comprises (a) a polyol entirely derived from a natural oil; and (b) a natural oil-petroleum blend polyol.

22. A method of reducing the modulus of a polyurethane sealant or adhesive composition, comprising
incorporating a modulus reducing additive comprising at least one of rosin esters, hydrogenated rosin esters, or mixtures thereof, into a composition comprising a polyurethane prepolymer comprising an isocyanate and a polyol, the polyol having a bio-based content of from about 15% to about 75% by weight;
wherein said modulus reducing additive reduces the extension modulus at 100% elongation of the sealant composition to less than about 72 psi as measured in accordance with ASTM D-412.

* * * * *